(12) United States Patent
Banister

(10) Patent No.: US 10,540,237 B2
(45) Date of Patent: *Jan. 21, 2020

(54) SYSTEM AND METHOD FOR PROCEDURE FOR POINT-IN-TIME RECOVERY OF CLOUD OR DATABASE DATA AND RECORDS IN WHOLE OR IN PART

(71) Applicant: SESAME SOFTWARE, INC., Santa Clara, CA (US)

(72) Inventor: Richard Banister, Escondido, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/181,338

(22) Filed: Nov. 5, 2018

(65) Prior Publication Data

US 2019/0102258 A1    Apr. 4, 2019

Related U.S. Application Data

(63) Continuation-in-part of application No. 14/855,552, filed on Sep. 16, 2015, now abandoned.

(51) Int. Cl.
*G06F 11/14*  (2006.01)
*G06F 16/27*  (2019.01)
*G06F 16/28*  (2019.01)
*G06F 3/0484* (2013.01)

(52) U.S. Cl.
CPC ........ *G06F 11/1451* (2013.01); *G06F 16/273* (2019.01); *G06F 16/284* (2019.01); *G06F 16/289* (2019.01); *G06F 3/04847* (2013.01); *G06F 2201/80* (2013.01); *G06F 2201/805* (2013.01); *G06F 2201/82* (2013.01)

(58) Field of Classification Search
CPC .... G06F 16/273; G06F 16/289; G06F 16/284; G06F 11/1451
USPC ................................. 707/685, 679, 999.204
See application file for complete search history.

(56) References Cited

U.S. PATENT DOCUMENTS

| | | | |
|---|---|---|---|
| 5,721,918 A * | 2/1998 | Nilsson | G06F 11/1471 |
| 6,208,990 B1 | 3/2001 | Suresh et al. | |
| 6,564,215 B1 | 5/2003 | Hsiao | |
| 6,850,947 B1 | 2/2005 | Chung et al. | |
| 7,293,027 B2 * | 11/2007 | Margolus | G06F 16/2358 |
| 7,330,997 B1 | 2/2008 | Odom | |
| 7,774,315 B1 | 8/2010 | Galker | |
| 7,822,717 B2 | 10/2010 | Kapoor | |
| 8,099,392 B2 * | 1/2012 | Paterson | G06F 11/1451 |
| | | | 707/654 |

(Continued)

*Primary Examiner* — Dung K Chau
(74) *Attorney, Agent, or Firm* — Patrick Reilly

(57) ABSTRACT

A user interface, system and method are provided for the recovery and restoration of software records or elements thereof to earlier record or data iterations or versions in order to overcome or repair consequences of database corruption or data deletion. A source database and/or a current archive database further enable recording of records of the source database to an historical data archive, from which records or elements thereof may be recovered. A restore command is detectable by the system as directly input via a user interface and/or as sent via an electronics communications modality or network. The databases and archives may have access to multiple iterations/versions of a record including the original record version as stored in an historical archive or elsewhere in a network. The records may optionally be updated in a batch method, in real time, and/or as the software records are created.

20 Claims, 37 Drawing Sheets

TARGET SYSTEM PROCESS

(56) References Cited

U.S. PATENT DOCUMENTS

| | | | |
|---|---|---|---|
| 8,117,165 B1 | 2/2012 | Winckelmann | |
| 8,311,988 B2 * | 11/2012 | Cisler | G06F 11/1466 |
| | | | 707/647 |
| 8,442,951 B1 | 5/2013 | Brannon | |
| 8,666,944 B2 | 3/2014 | Beatty | |
| 9,286,166 B2 | 3/2016 | Paterson | |
| 9,454,587 B2 * | 9/2016 | Lyons | G06F 11/1458 |
| 9,831,787 B1 | 11/2017 | Yueh | |
| 10,117,047 B1 * | 10/2018 | Chowdhury | H04M 1/72522 |
| 2002/0138376 A1 * | 9/2002 | Hinkle | G06Q 40/00 |
| | | | 705/30 |
| 2002/0161784 A1 | 10/2002 | Tarenskeen | |
| 2003/0120625 A1 | 6/2003 | Jackson | |
| 2004/0078228 A1 | 4/2004 | Fitzgerald | |
| 2004/0236796 A1 | 11/2004 | Bhatt | |
| 2005/0055518 A1 | 3/2005 | Hochberg | |
| 2005/0055519 A1 | 3/2005 | Stuart | |
| 2006/0179155 A1 | 8/2006 | Bunting | |
| 2007/0100913 A1 | 5/2007 | Sumner | |
| 2007/0136381 A1 | 6/2007 | Cannon | |
| 2007/0185937 A1 | 8/2007 | Prahlad | |
| 2008/0034011 A1 * | 2/2008 | Cisler | G06F 11/1469 |
| 2008/0263007 A1 | 10/2008 | Schmidt | |
| 2008/0307345 A1 * | 12/2008 | Hart | G06F 11/1448 |
| | | | 715/769 |
| 2008/0307347 A1 * | 12/2008 | Cisler | G06F 11/1458 |
| | | | 715/771 |
| 2009/0249005 A1 | 10/2009 | Bender | |
| 2010/0082553 A1 | 4/2010 | Beatty | |
| 2010/0318495 A1 | 12/2010 | Yan | |
| 2011/0167138 A1 | 7/2011 | Bodziony et al. | |
| 2012/0124081 A1 | 5/2012 | Ebrahimi | |
| 2012/0221522 A1 | 8/2012 | Allman et al. | |
| 2013/0191523 A1 | 7/2013 | Buck | |
| 2013/0212599 A1 * | 8/2013 | Giampaolo | G06F 11/1461 |
| | | | 719/318 |
| 2013/0238552 A1 | 9/2013 | Salb | |
| 2013/0275379 A1 | 10/2013 | Trebas | |
| 2014/0006357 A1 | 1/2014 | Davis | |
| 2014/0007239 A1 | 1/2014 | Sharpe | |
| 2014/0074790 A1 | 3/2014 | Berman | |
| 2014/0229506 A1 | 8/2014 | Lee | |
| 2015/0066865 A1 | 3/2015 | Yara | |
| 2015/0142751 A1 | 5/2015 | Bruce | |
| 2015/0163206 A1 | 6/2015 | McCarthy | |
| 2015/0205850 A1 | 7/2015 | Lu | |
| 2015/0331755 A1 | 11/2015 | Morgan | |

* cited by examiner

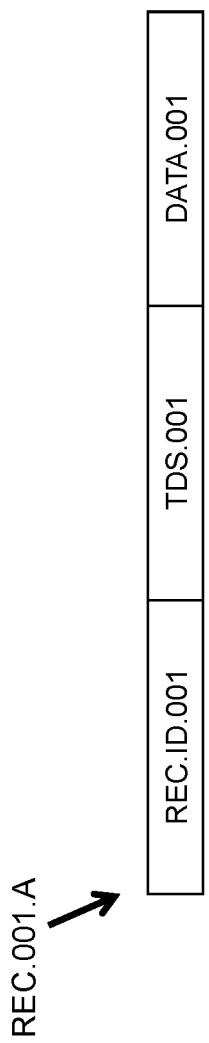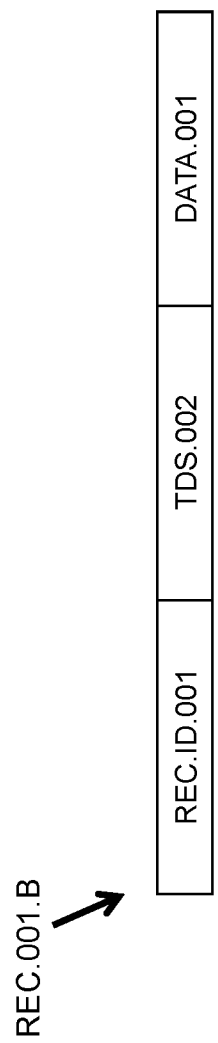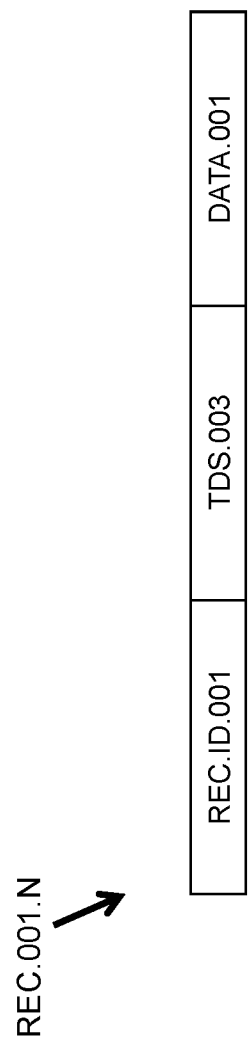

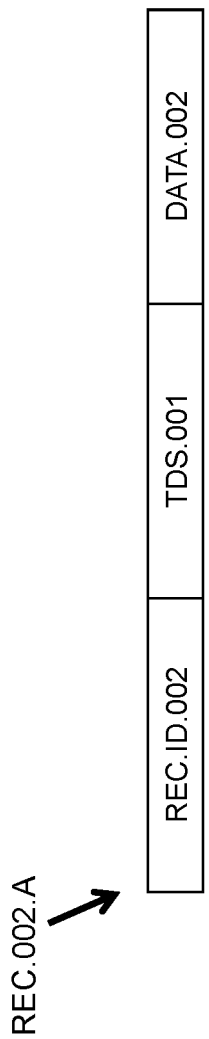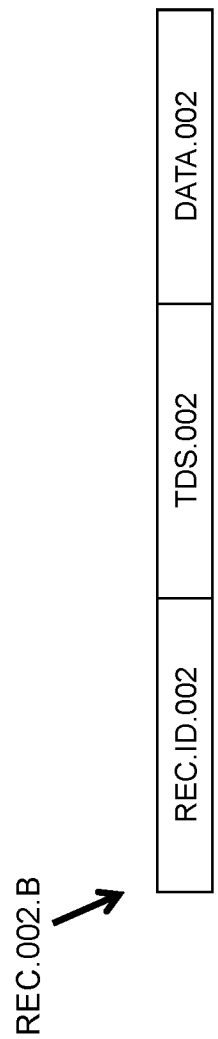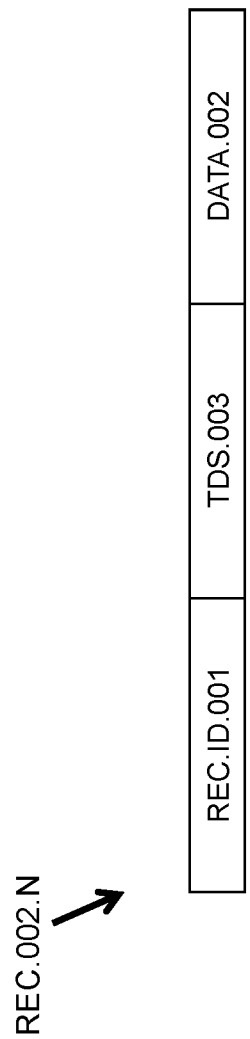

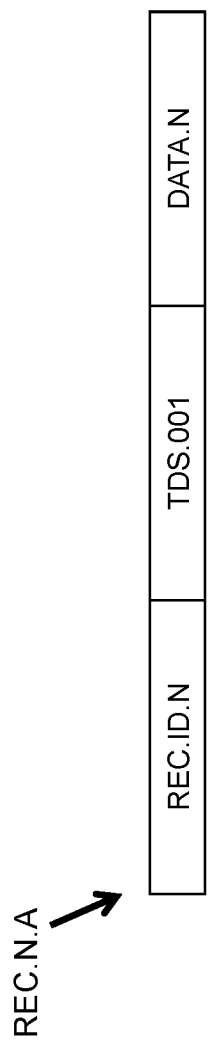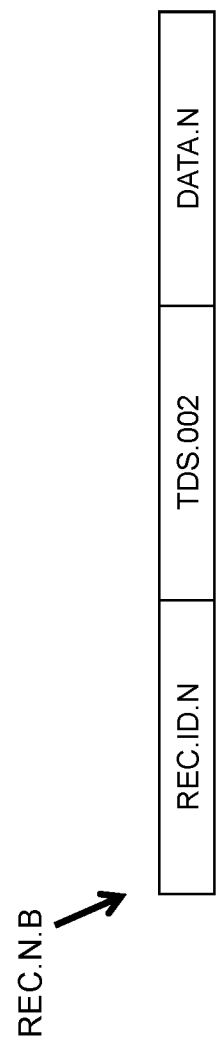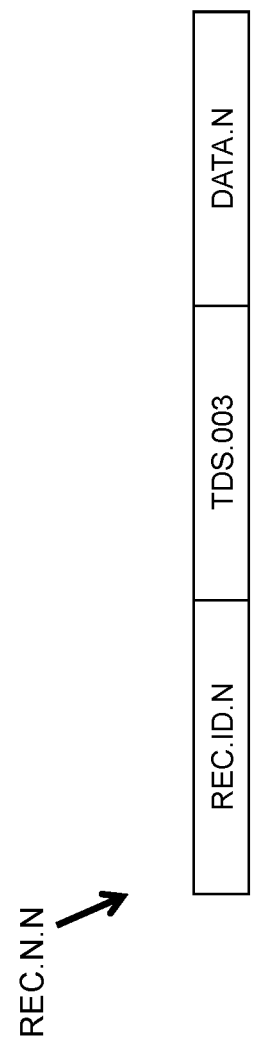

MESSAGE: SOURCE SYSTEM TO TARGET SYSTEM

MESSAGE: TARGET SYSTEM TO SOURCE SYSTEM

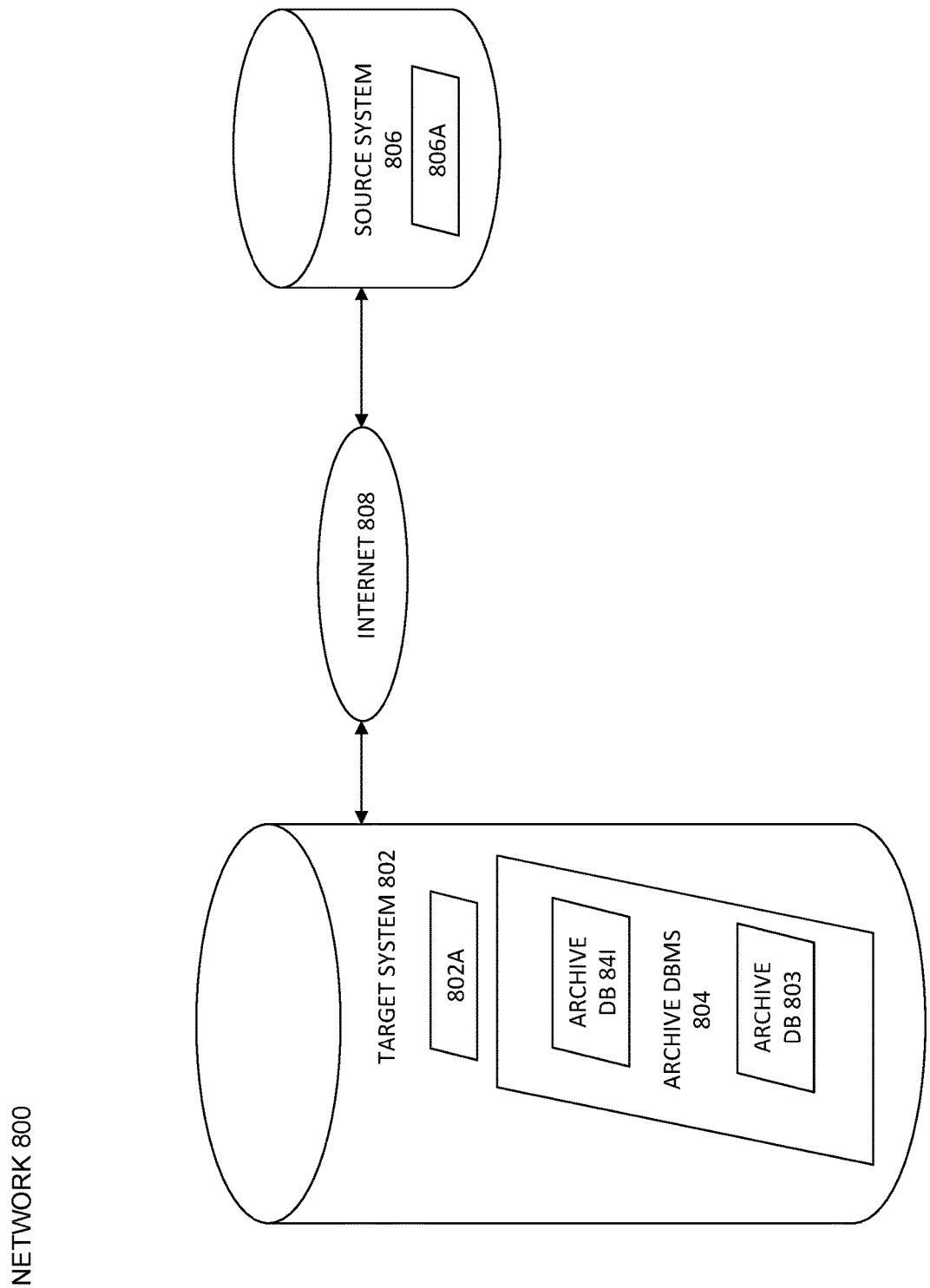

HISTORICAL DATA ARCHIVE 1104

OBJ.HDA.NM

| REC.001.RQ | REC.001.RP | REC.001.RL | REC.001.RG | REC.001.RA |
| REC.002.RQ | REC.002.RP | REC.002.RF | REC.002.RE | REC.002.RA |
| REC.003.RQ | REC.003.RP | REC.003.RH | REC.003.RB | REC.003.RA |
| REC.004.Rj | REC.004.RI | REC.004.RF | REC.004.RD | REC.004.RA |
| REC.005.RQ | REC.005.RP | REC.005.RL | REC.005.RG | REC.005.RA |
| REC.006.RQ | REC.006.RP | REC.006.RH | REC.006.RE | REC.006.RA |
| REC.N.RQ | REC.N.RP | REC.N.Rj | REC.N.NRH | REC.N.RA |

DELETE FLAG POS
REV "RJ"

FIGURE 11D

| REC.ID.003.RQ | TDS.003.RQ | DATA.003.RQ | UF.003.RQ | DF.003.RQ |

REC.003.RQ → (arrow to REC.ID.003.RQ)
UPDATE FLAG → UF.003.RQ
DELETE FLAG → DF.003.RQ

FIGURE 14A

| REC.ID.003.RR | TDS.003.RR | DATA.003.RR | UF.003.RR | DF.003.RR |

REC.003.RR → (arrow to REC.ID.003.RR)

FIGURE 14B

| REC.ID.003.RQ' | TDS.003.RQ' | DATA.003.RQ' | UF.003.RQ' |
| REC.ID.003.RQ | TDS.003.RQ | DF.003.RQ' |

REC.003.RQ' → (arrow to REC.ID.003.RQ')

RECOVERY BY SPECIFIED DATA FIELD

FIGURE 14C

FIGURE 15A — WORKFLOW RECORD WITH REC REV ID'S ONLY & OPTIONALLY WITH UPDATE FLAGS SET TO POSITIVE

WFREC.001: | WFREC.ID.001 | REC.ID.001.RQ | REC.ID.003.RQ | REC.ID.004.RQ | REC.ID.N.RQ |

FIGURE 15B — WORKFLOW RECORD WITH FULL RECORD REVISIONS & OPTIONALLY WITH UPDATE FLAGS SET TO POSITIVE

WFREC.002: | WFREC.ID.002 | REC.001.RQ | REC.003.RQ' | REC.003.RQ | REC.004.RQ | REC.N.RQ |

FIGURE 15C — WORKFLOW MESSAGE TO BE SENT TO SOURCE DB SYSTEM

WFREC.MSG.001: | TGT.ADDR | SDB.ADDR | WFREC.MSG.ID.001 | WFREC.001 | WFREC.002 |

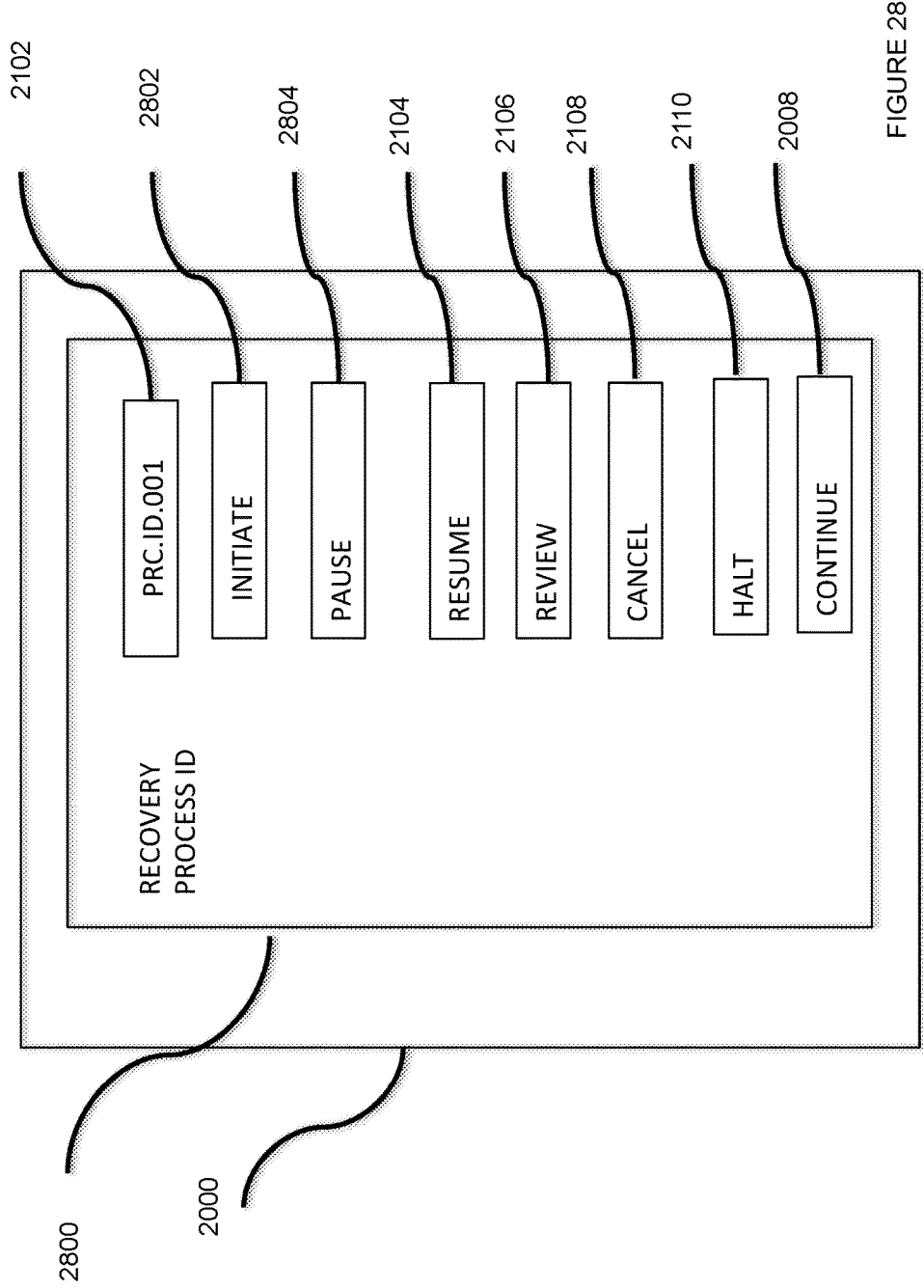

SYSTEM AND METHOD FOR PROCEDURE FOR POINT-IN-TIME RECOVERY OF CLOUD OR DATABASE DATA AND RECORDS IN WHOLE OR IN PART

CO-PENDING PATENT APPLICATION

This Nonprovisional Patent Application is a Continuation Application to U.S. Nonprovisional patent application Ser. No. 14/855,552 as filed on Sep. 16, 2015 by Inventor Richard Banister and titled "System and Method for Time Parameter Based Database Restoration".

FIELD OF THE INVENTION

The present invention relates to a process for the maintenance and update of digitized records. More particularly, the present invention relates to user interfaces, methods and information technology systems and networks for restoring the state of records database to state existing before a specific time or event-time occurrence.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Databases are ubiquitous and crucial in consumer, business, and government operations. However, databases or records thereof may be unintentionally corrupted and/or undesirably deleted, or a user may have a fear that database or database element corruption or deletion may have occurred. Yet, there exists no optimal method or system in the prior art to enable the efficient recovery and/or restoration of database records in whole or in part from a designated time and/or designated time of an event occurrence.

There is therefore a long-felt need to provide a method and system that provide the regeneration of databases as they existed at or before a designated time or event occurrence.

SUMMARY AND OBJECTS OF THE INVENTION

Towards these objects and other objects that will be made obvious in light of the present disclosure, the method of the present invention (hereinafter, "the invented method") a user interface, an information technology system and a method are provided to enable a user to direct an information technology system recover a database, in whole or in part, as the database substantially existed.

According to certain alternative and/or additional aspects of the invented method, a user interface, a system and a method are provided for the recovery and restoration of software records of a database server en masse or optionally by selection of individual records from any point in time.

According to still other alternative and/or additional aspects of the invented method, certain consequences of database corruption, data deletion and/or record deletion may be overcome, eliminated or negated.

According to yet other alternative and/or additional aspects of the invented method, information comprising or comprising an audit trail useful for regulatory, legal or institutional compliance purposes is harvested, generated, and/or recovered.

Certain additional alternate embodiments of the invented method optionally provide (1.) a source database; (2.) a current data archive operable for at least the purpose of recording each or specific current version of software records added, modified or deleted in the source database; and (3.) and an historical data archive operable to store prior versions of each record and/or specified records. The current data archive may be or comprise, or be comprised within, a copy of the source database; additionally, alternatively or optionally, the current data archive may be, comprise, or be comprised within Source Database itself.

Where the current data archive is, comprises, or is comprised within a copy of the source database, the invented method optionally provides a data replication process that may be assumed and/or tasked to copy some or all changes to the current data archive, including flagging one or more data records of the source database as having been deleted with the final version of a distinguishable record and/or optionally the user and date that the source database record was deleted. Alternatively and/or additionally, certain or all data records of the source database may be modified or deleted in the source database, wherein, the prior version of each relevant data record version present in the current data archive is first copied to the historical data archive.

Certain yet additional alternate embodiments of the invented method optionally provide a record selection process that may optionally (1.) specify a plurality or all database objects; (2.) may be limited to one or more individual fields on any given record or plurality of records; and/or (3.) may involve choosing an event time range which is applied to selecting data records based on time stamps in, of or associated with the relevant data records. With or without the time range selection criteria, individual records and their versions, and related records and versions may optionally, alternatively and/or additionally be selectively recovered, in whole or in part. The results of the record selection process are stored in a system-executable and/or network-executable restore workflow.

The record selection process of certain even additional aspects of the invented method may optionally, alternatively or additionally be operable, controllable and/or initiated from an application server or a remote user interface, using the system executable and/or network-executable restore workflow.

According to even other optional aspects of the invented method a subsequent restore process may optionally, alternatively or additionally be initiated by an application server directly from user input, from a remote application server, or from a command line interface. The restore process may execute the restore workflow provided by the record selection process. During the restore process, a current record in the current data archive database would be copied to the historical data archive database as a fallback recovery point. A plurality or all fields from selected records and optionally from the historical data archive database may optionally be copied to the current data archive database, with status indicators on the records optionally inserted or updated to the source database as needed, advisable or preferred.

According to yet other optional additional aspects of the invented method the Source Database records may optionally, alternatively or additionally be updated in batch mode and/or may alternatively or additionally be updated in real time at a specified time or detection of a specified event.

In a first preferred embodiment of the method of the present invention (hereinafter "the invented method"), a software record revision is received and is selected or assigned for inclusion in a first database (hereinafter, "the target database"). When an earlier version of this instant database record is currently stored in the target database, the earlier database record is stored in an archival database (hereinafter, "the archive") and the newly designated software record revision is then written into the target database. Preferably, the earlier version of the instant record is deleted from the target database, wherein the earlier version may be merely deleted from the target database or overwritten with the newer software record revision.

According to still other optional aspects of the invented invention, a computer system having access to the archive receives or generates a restore date time data. The archive is then examined and each software record having a revision with a revision date time stamp previous to the restore date time data is selected; when a selected record has more than one revision stored in the archive, the revision of the selected record having a revision time date stamp earlier than but closest to the restore date time data is selected for a restore action. In the restore action, each selected record revision is communicated to a remote database server and/or the target database.

According to yet other optional aspects of the invented method, the target database is not revised with the selected record revisions in the restore action and a remote database (hereinafter, ("source database") is provided with the record revisions selected for the restore action.

According to yet further optional aspects of the invented method, the target database is revised with the selected record revisions in the restore action.

In even other further optional aspects of invented method, the target database may optionally receive and update software records in one of two manners. First, the archive may optionally receive software records and record revisions in a batch method, i.e. by receiving a plurality of records from a remote source server within a substantively contemporaneous download, and by updating and storing the software records and record revision as a group. Additionally and optionally, the target database may optionally receive and update the software records and record updates in real time, i.e. when a software record is created or updated, the software record may be individually transmitted to the target database to be stored.

The source database and/or the target database may be or comprise an object-oriented database, a relational database, and/or a NoSQL database. It is understood that the scope of meaning of the term "NoSQL" as defined within the present disclosure includes a class of database management systems that do not follow all of the rules of a relational database management system and might not use traditional structured query language (hereinafter, "SQL") to query data. This type of database is generally a complementary addition to relational database management systems and SQL. Some notable implementations of NoSQL are the CASSANDRA DATABASE™ marketed by Facebook, Inc., of Menlo Park, Calif.; BIGTABLE™ marketed by Google, Inc., of Mountain View, Calif.; and SIMPLEDB™, marketed by Amazon.com, Inc., of Seattle, Wash.

A NoSQL database does not necessarily follow the strict rules that govern transactions in relational databases. These violated rules are Atomicity, Consistency, Integrity, Durability. For example, NoSQL databases do not use fixed schema structures and SQL joins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIGS. 4A-4C are block diagrams of revisions of an exemplary first software record;

FIGS. 5A-5C are block diagrams of revisions of an exemplary second software record;

FIGS. 6A-6C are block diagrams of revisions of an exemplary Nth software record;

FIG. 7A is a block diagram of an exemplary restore command;

FIG. 7B is a block diagram of an exemplary first software record containing message transmitted from the archive database management system to the source server;

FIG. 8 is a diagram of an electronic communications network, comprising a target system, a source server, and an archive database management system, bidirectionally communicatively coupled by means of the Internet bidirectionally coupled to the source server;

FIG. 11D is a block diagram illustrating the historical data archive of FIG. 11A;

FIG. 14A is a block diagram of aspects and elements of a version of the third data record of FIG. 10;

FIG. 14B is a block diagram of aspects and elements of an additional version of the third data record of FIG. 10;

FIG. 14C is a block diagram of aspects and elements of another version of the third data record of FIG. 10;

FIG. 15A is a block diagram of aspects and elements of an exemplary first workflow record;

FIG. 15B is a block diagram of aspects and elements of an exemplary second workflow record; Referring now generally to the Figures and particularly to FIG. 15C, FIG. 15C is a block diagram of aspects and elements of an exemplary first workflow record message;

Referring now generally to the Figures and particularly to FIG. 17B.

FIG. 28 is a screen shot of a ninth user input screen as rendered by the target display module of FIG. 9 in accordance with step 19.36 of FIG. 19.

DETAILED DESCRIPTION

Figure 1:
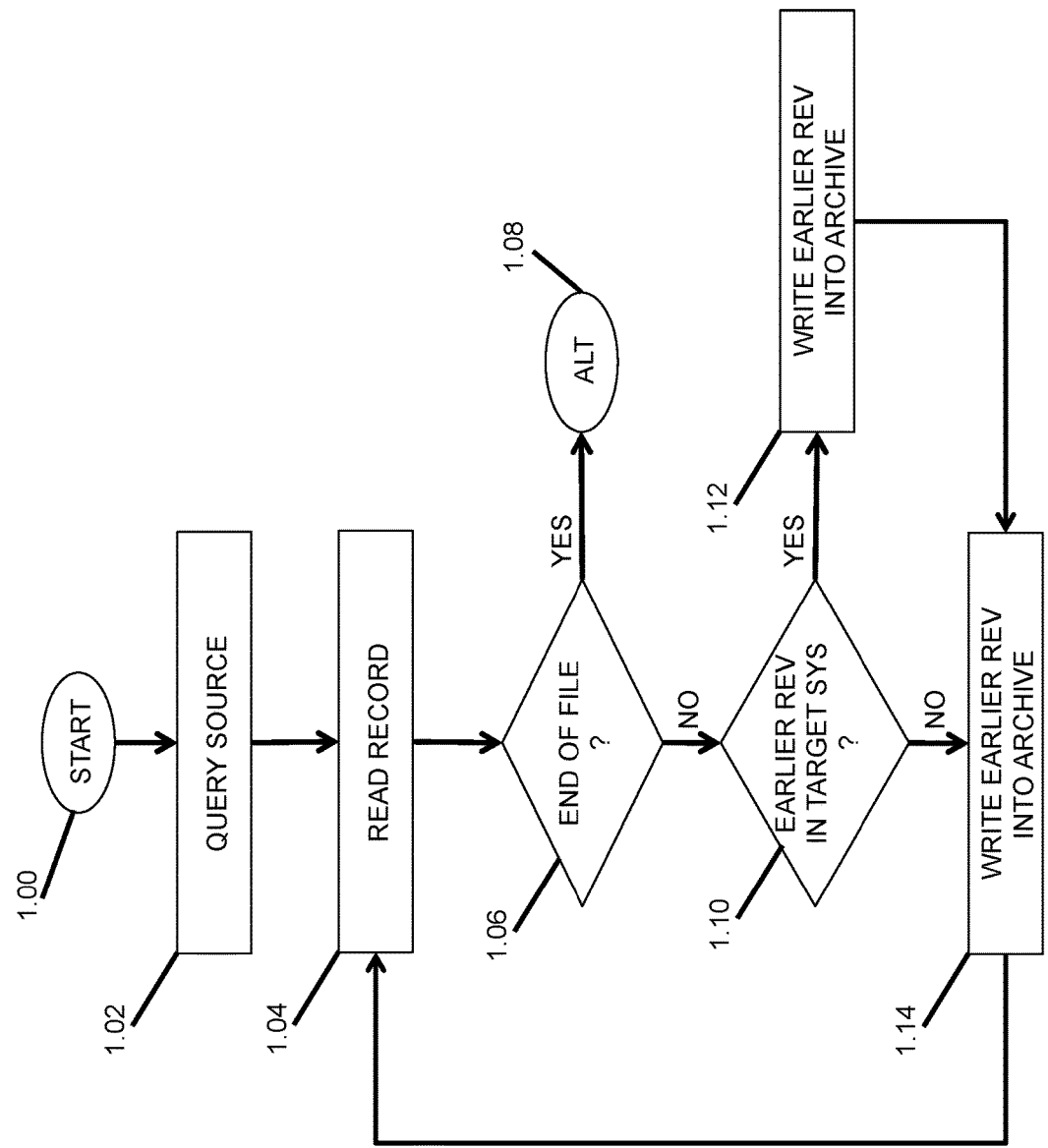
FIG. 1 is a flowchart of a preferred embodiment of the invented method whereby a record is received, stored, and restored by a target system.

Referring now generally to the Figures, and particularly to FIG. 1, FIG. 1 is a flowchart of a preferred aspect of the invented method, whereby one or more software records REC.001-REC.N are selected, stored and restored by a target database management system 802 (hereinafter, "target system" 802). In step 1.02 the target system 802 queries a source server 806 for one or more software records REC.001-REC.N. In step 1.04 the target system 802 reads an exemplary first received software record REC.001. In step 1.06 the target system 802 determines whether the exemplary data record REC.001 read in step 1.04 is an end of file marker EOF.001, marking the end of an exemplary file of received software records REC.001-REC.N. When the target system 802 determines in step 1.06 that an end of file marker EOF.001 has been read, the target system 802 proceeds directly to step 1.08, wherein the target system 802 executes alternate operations. Alternatively, when the target system 802 determines in step 1.06 that an end of file marker EOF.001 has not been read, the target system 802 determines in step 1.10 whether an earlier revision REC.001.A-REC.001.N of the exemplary software record REC.001 exists within a memory 802G of the target system 802. In order to determine whether earlier revisions REC.001.A-REC.001.N of a designated software record REC.001 exist within the target system 802, the target system 802 compares a record identifier REC.ID.001 of the new record REC.001 to the record identifiers of the records REC.001-REC.N within the memory 802G of the target system 802. When the target system 802 determines in step 1.10 that an earlier revision REC.001.A-REC.001.N of the exemplary software record REC.001 exists within the memory 802G of the target system 802, the target system 802 writes the earlier revision REC.001.A-REC.001.N to an archive database 1003 of an archive database management system 804 in step 1.12. In the alternative, when the target system 802 determines in step 1.10 that no earlier revision REC.001.A-REC.001.N of the exemplary software record REC.001 exists within the memory 802G of the target system 802, or upon execution of step 1.12, the target system 802 stores the new revision REC.001.A-REC.001.N of the exemplary software record REC.001 in the memory 802G of the target system 802.

Figure 2:
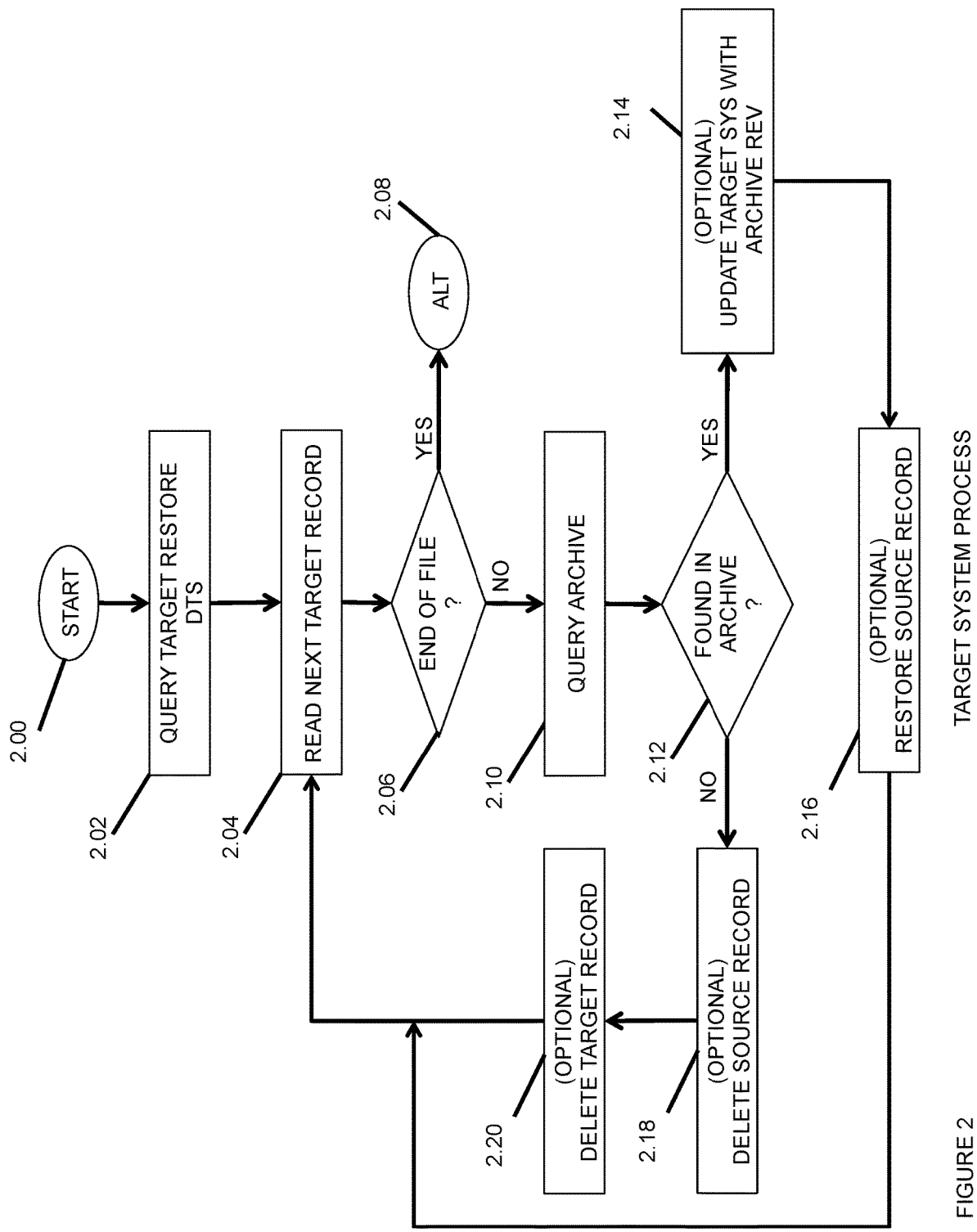
FIG. 2 is flowchart of a preferred embodiment of the invented method whereby a restore command is executed by the target system.

Referring now generally to the Figures, and particularly to FIG. 2, FIG. 2 is a flowchart of a preferred embodiment of the invented method whereby a restore command RST.CMD.001 is executed by the target system 802. In step 2.02 the target system 802 queries the target database memory 802G for the date time stamp of the restore command CMD.DTS.001. In step 2.04 the target system 802 reads a first software record REC.001-REC.N in the target system 802. In step 2.06 the target system 802 determines whether an end of file marker EOF.001 has been read. When the determination in step 2.06 that an end of file marker EOF.01 has been read, the target system 802 executes alternate operations in step 2.08. Alternatively, when the determination in step 2.06 that an end of file marker EOF.01 has not been read, the target system 802 queries the archive database management system 804 (hereinafter, "the archive DBMS" 804) for a data record REC.001-REC.N having a same record identification REC.ID.001-REC.ID.N as the target record REC.001-REC.N read in step 2.04. In step 2.12 the target system 802 determines whether the data record REC.001-REC.N having a same record identification REC.ID.001-REC.ID.N as the target record REC.001-REC.N read in step 2.04 is present in the archive DBMS 804. When the target system 1102 determines in step 2.12 that the data record REC.001-REC.N having a same record identification REC.ID.001-REC.ID.N as the target record REC.001-REC.N read in step 2.04 is no present in the archive DBMS 804, the target system 802 proceeds to optional step 2.14, wherein the target system 802 is optionally updated with the record revision REC.001.A-REC.001.N found in the archive DBMS 804. In optional step 2.16 the target system 802 optionally transmits the restored record REST.REC.001-REST.REC.N to the source server 806.

In the alternative, when the target system determines in step 2.12 the data record REC.001-REC.N having a same record identification REC.ID.001-REC.ID.N as the target record REC.001-REC.N read in step 2.04 is present in the archive DBMS 804, the target system 802 proceeds to optional step 2.18. In optional step 2.18 the record revision REC.001.A-REC.001.N in the source server 806 is optionally deleted. The record revision REC.001.A-REC.001.N may optionally be deleted outright, or may be overwritten by the incoming record revision REC.001.A-REC.001.N. In optional step 2.20 the record revision REC.001.A-REC.001.N in the target system 802 is optionally deleted. The record revision REC.001.A-REC.001.N may optionally be deleted outright, or may be overwritten by the new record revision REC.001.A-REC.001.N. In various alternate preferred embodiments of the invented method, upon successful execution of step 2.12, step 2.14, step 2.16, step 2.18 or step 2.20, the target system 802 returns to step 2.04, wherein an additional record REC.001-REC.N is read by the target system 802.

Figure 3:
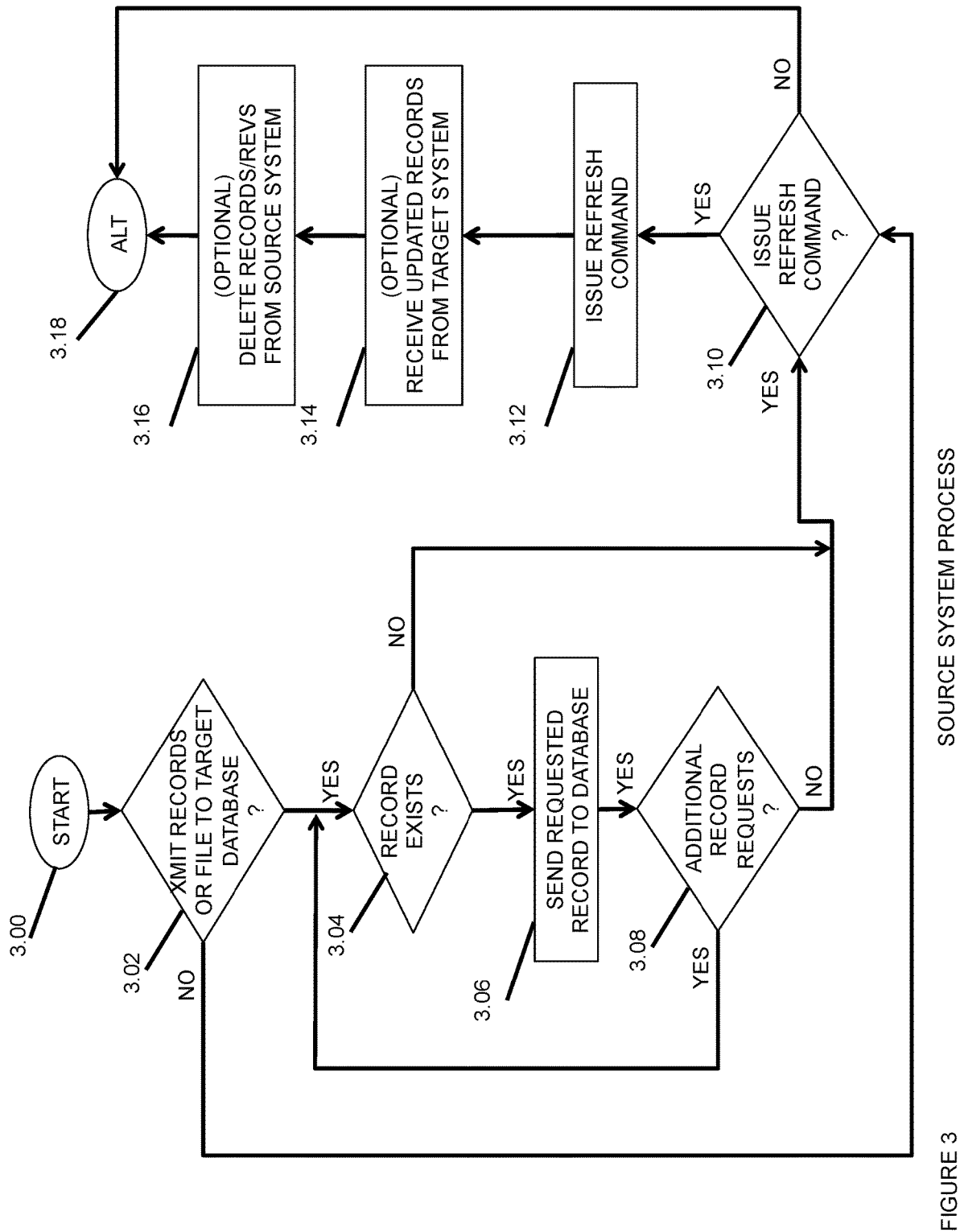
FIG. 3 is a flowchart of a an aspect of the preferred embodiment of the invented method whereby the source server transmits software records and/or a restore command to the target system.

Referring now generally to the Figures, and particularly to FIG. 3, FIG. 3 is a flowchart of an aspect of the invented method whereby the source server 806 transmits a restore command RST.CMD.001 and/or one or more software records REC.001-REC.N to the target system 802. In step 3.02 the source server 806 determines whether to transmit one or more software records REC.001-REC.N, either individually or in a file of software records REC.001-REC.N to the target system 802. When the source server 806 determines in step 3.02 to transmit one or more software records REC.001-REC.N, the source server 806 determines in step 3.04 whether the requested record(s) REC.001-REC.N exist within the memory 806G of the source server 806. When the source server 806 determines in step 3.04 that the requested record(s) REC.001-REC.N exist within the memory 806G of the source server 806, the source server 806 transmits the requested one or more software record(s) REC.001-REC.N to the target system 802. In step 3.08 the source server 806 determines whether additional software record request messages REQ.001-REQ.N for software records REC.001-REC.N have been received from the target system 802. When the source server 806 determines in step 3.08 that additional software record request messages REQ.001-REQ.N for software records REC.001-REC.N have been received from the target system 802, the source server 806 proceeds to step 3.04 and repeats the loop of steps 3.04 through 3.08 until it is determined in step 3.08 that no additional software record request messages REQ.001-REQ.N for software records REC.001-REC.N have been received from the target system 802.

When the source server 806 determines in step 3.02 not to transmit one or more software records REC.001-REC.N to the target system 802, or when the source server 806 determines that the requested record(s) REC.001-REC.N do not exist within the memory 806G of the source server 806 in step 3.04, or when the source server 806 determines that no additional software record request messages REQ.001-REQ.N for software records REC.001-REC.N have been received from the target system 802 in step 3.08, the source server 806 proceeds to step 3.10, wherein the source server 806 determines whether to issue a restore command RST.CMD.001 to the target system 802. When the source server 806 determines in step 3.10 to issue a restore command RST.CMD.001 to the target system 802, the source server 806 issues the restore command RST.CMD.001 to the target system 802 in step 3.12. In optional step 3.14, the source server 806 may optionally receive restored software records REST.REC.001-REST.REC.N from the target system 802. In further optional step 9.16 the source server 806 may optionally delete designated records REC.001-REC.N and/or record revisions REC.001.A-REC.N.N from the memory 806G of the source server 806. Alternatively, when the source server 806 determines in step 3.10 not to issue a restore command RST.CMD.001 to the target system 802, the source server 806 proceeds to step 3.18, wherein the source server 806 executes alternate operations.

Referring now generally to the Figures, and particularly to FIGS. 4A through 4C, FIGS. 4A through 4C are block diagrams of exemplary software record versions REC.001.A-REC.002.N, which may optionally be stored within the target system 802, the archive DBMS 804, and/or the source server 806. FIGS. 4A through 4C show exemplary first, second and Nth software record versions REC.001.A, REC.001.B and REC.001.C, respectively, which exemplary first, second, and third software record versions REC.001.A, REC.001.B and REC.001.N comprise: a first record identifier REC.ID.001 by which the first software record versions REC.001 may be recognized by the target system 802, by the archive DBMS 804, and/or by the source server 806; a first time date stamp TDS.001, a second time date stamp TDS.002, and a third time date stamp TDS.003, describing the time at which the software record version REC.001.A, REC.001.B and REC.001.N were created, respectively; and record data DATA.001.

The inclusion of three optional time date stamps TDS.001 through TDS.003 is for illustrative purposes only, and should not be construed as a restriction on the number of revisions which may occur for an exemplary software record REC.001, which number of revisions may be as numerous or as few as is deemed necessary by a user 808 or by target system software SW.TGT of the target system 802, software SW.ARC of the archive DBMS 804, and/or software SW.SRC of the source server 806.

Referring now generally to the Figures, and particularly to FIGS. 5A through 5C, FIGS. 5A through 5C are block diagrams of exemplary software records REC.002.A-REC.002.N, which may optionally be stored within the target system 802, the archive DBMS 804, and/or the source server 806. FIGS. 5A through 5C show exemplary first, second and Nth software record versions REC.002.A, REC.002.B and REC.002.N, respectively, which exemplary first, second, and Nth software record versions REC.002.A. REC.002B and REC.002.N comprise: a second record identifier REC.ID.002 by which the second software record REC.002 may be recognized by the target system 802, by the archive DBMS 804, and/or by the source server 806; a first time date stamp TDS.001, a second time date stamp TDS.002, and a third time date stamp TDS.003, describing the time at which the software record version REC.001.A, REC.001.B and REC.001.N were created, respectively; and record data DATA.002.

Referring now generally to the Figures, and particularly to FIGS. 6A through 6C, FIGS. 6A through 6C are block diagrams of exemplary software records REC.N. A-REC.N.N, which may optionally be stored within the target system 802, the archive DBMS 804, and/or the source server 806. FIGS. 6A through 6C show exemplary first, second and Nth software record versions REC.N.A, REC.N.B and REC.N.N, respectively, which exemplary first, second, and Nth software record versions REC.N.A. REC.N.B and REC.N.N comprise: an Nth record identifier REC.ID.N by which the Nth software record REC.N may be recognized by the target system 802, by the archive DBMS 804, and/or by the source server 806; a first time date stamp TDS.001, a second time date stamp TDS.002, and a third time date stamp TDS.003, describing the time at which the software record version REC.N.A, REC.N.B and REC.N.N were created, respectively; and record data DATA.N.

Referring now generally to the Figures, and particularly to FIG. 7A, FIG. 7A is a block diagram of an exemplary restore command RST.CMD.001. The exemplary restore command RST.CMD.001 comprises: a restore command identifier RST.ID.001, by which the restore command RST.CMD.001 may be recognized by the target system 802, by the archive DBMS 804, and/or by the source server 806; a command time date stamp CMD.TDS.001, indicating the time point to which the restore command RST.CMD.001 will return the designated software records REC.001-REC.N; an address of the source server 806 SRC.ADDR as the sending address of the restore command RST.CMD.001; and an address of the target system 802 TGT.ADDR as the receiving address of the restore command RST.CMD.001;

Referring now generally to the Figures, and particularly to FIG. 7B, FIG. 7B is a block diagram of an exemplary first software record REC.001-REC.N containing message MSG.001 (hereinafter "first message MSG.001") transmitted from the archive DBMS 804 to the source server 806. The exemplary first MSG.001 contains: a first unique message identifier MSG.ID.001, by which the exemplary first message may be recognized; a message time date stamp MSG.TDS.001, indicating the time point at which the first MSG.001 was transmitted; an address ARC.ADDR of the archive DBMS 804 as the sending address of the first message MSG.001; an address SRC.ADDR of the source server 806 as the receiving address of the first message MSG.001; and a plurality of software records REC.001-REC.N.

Figure 7C:
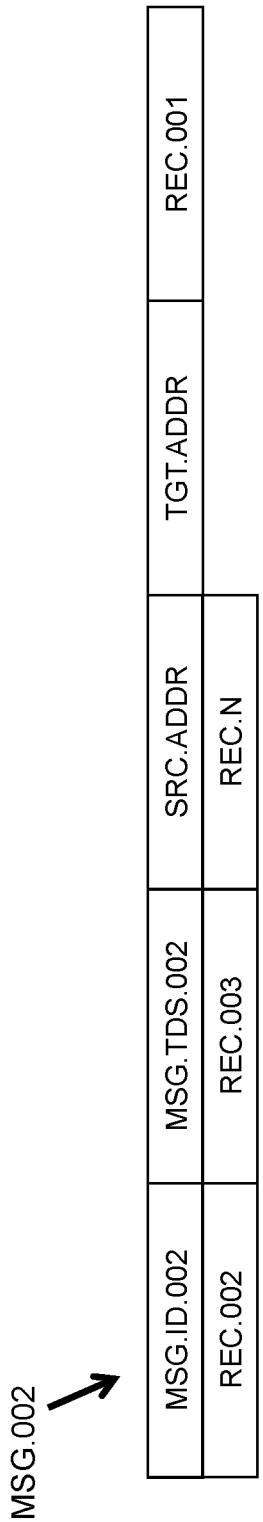
FIG. 7C is a block diagram of an exemplary second software record containing message transmitted from the source server to the target system.

Referring now generally to the Figures, and particularly to FIG. 7C, FIG. 7C is a block diagram of an exemplary second software record REC.001-REC.N containing message MSG.002 (hereinafter "second message MSG.002") transmitted from the source server 806 to the target system 802. The second message MSG.002 comprises: a second message identifier MSG.ID.002, by which the second message MSG.002 maybe recognized; a second message time date stamp MSG.TDS.002, indicating the time point at which the second message MSG.002 was transmitted from the source server 806; an address SRC.ADDR of the source server 806 as the sending address of the second message MSG.002; an address TGT.ADDR of the target system 802 as the receiving address of the second message MSG.002; and a plurality of software records REC.001-REC.N.

Figure 7D:
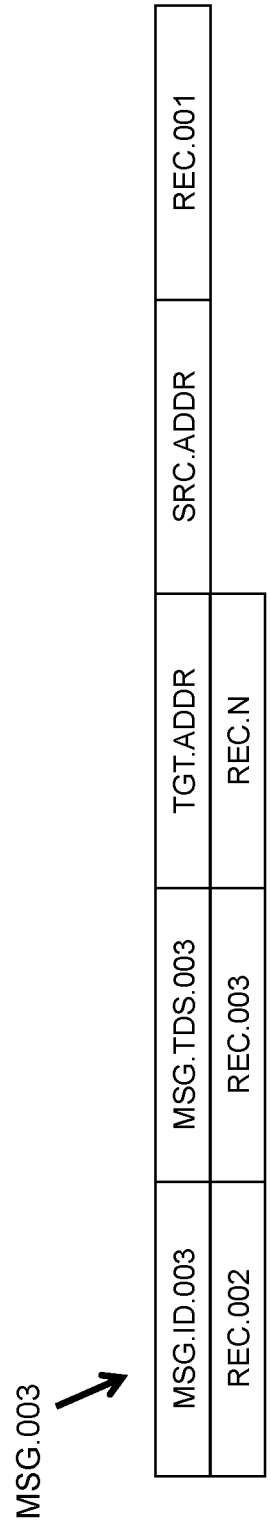
FIG. 7D is a block diagram of an exemplary third software record containing message transmitted from the target system to the source server.

Referring now generally to the Figures, and particularly to FIG. 7D, FIG. 7D is a block diagram of an exemplary third software record REC.001-REC.N containing message MSG.003 (hereinafter "third message MSG.003") transmitted from the target system 802 to the source server 806. The third message MSG.003 comprises: a third message identifier MSG.ID.003, by which the third message MSG.003 may be recognized; a third message time date stamp MSG.TDS.003, indicating the time point at which the third message MSG.003 was transmitted from the target system 802; an address TGT.ADDR of the target system 802 as the sending address of the third message MSG.003; an address SRC.ADDR of the source server 806 as the receiving address of the third message MSG.003; and a plurality of software records REC.001-REC.N.

Referring now generally to the Figures, and particularly to FIG. 8, FIG. 8 is a diagram of an electronic communications network optionally comprising the Internet 801. The electronic communications network 800 may further comprise a target system 802, an archive DBMS 804, and a source server 806, bidirectionally coupled to the source server 806. The electronic communications network 800 bi-directionally communicatively couples, wherein the bidirectional communicative coupling may be accomplished via the Internet 801 and/or other suitable communications structures, equipment and systems known in the art. The archive DBMS 804, the source server 806, and the target system 802, each preferably comprise or are bi-directionally communicatively coupled with a separate database management system software, respectively an archive DBMS 804, a source DBMS 806A, and a target DBMS 802A.

The archive DBMS 804, the source DBMS 806A, and/or the target DBMS 802A may be or comprise an object oriented database management system ("OODBMS"), a relational database management system ("RDBMS") and/or an NoSQL database management system, and one or more databases DBS 8041, DBS 8061, and/or DBS 8021, may be or comprise an object oriented database, a relational database and/or an NoSQL database. More particularly, the archive DBMS 804 and/or the source database DBMS 806A may be or comprise one or more prior art database management systems including, but not limited to, an ORACLE DATABASE™ database management system marketed by Oracle Corporation, of Redwood City, Calif.; a Database 2™, also known as DB2™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; the POSTGRESQL™ open source object-relational database management system; and/or a NoSQL database.

It is understood that the scope of meaning of the term "NoSQL" as defined within the present disclosure includes a class of database management systems that do not follow all of the rules of a relational database management system and might not use traditional structured query language (hereinafter, "SQL") to query data. This type of database is generally a complementary addition to relational database management systems and SQL. Some notable implementations of NoSQL are the CASSANDRA DATABASE™, marketed by Facebook, Inc., of Menlo Park, Calif.; BIGTABLE™ marketed by Google, Inc., of Mountain View, Calif.; and SIMPLEDB™, marketed by Amazon.com, Inc., of Seattle, Wash.

A NoSQL database does not necessarily follow the strict rules that govern transactions in relational databases. These violated rules are Atomicity, Consistency, Integrity, Durability. For example, NoSQL databases do not use fixed schema structures and SQL joins.

The source server 806 may bi-directionally communicate and transfer data with the archive DBMS 804 and the target system 802 via the network 800 by suitable electronic communications messaging protocols and methods known in the art including, but not limited to, Simple Object Access Protocol, Representational State Transfer, and/or a web service adapted to conform with the architecture and structure of the World Wide Web.

It is understood that the archive DBMS 804 comprises an archive system software program SW.ARC comprised within, hosted by and/or enabled by a bundled computer software and hardware product such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the source server 806 additionally comprises a source system software program SW.SRC comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

It is understood that the target system 802 also comprises a local system software program SW.TGT comprised within, hosted by and/or enabled by a bundled computer software and hardware product, such as, but not limited to, a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, or WINDOWS 8™ operating system marketed by Microsoft Corporation of Redmond, Wash.; or (d.) other suitable computational system or electronic communications device known in the art capable of providing or enabling a electronic communications and database management operations known in the art.

Figure 9:
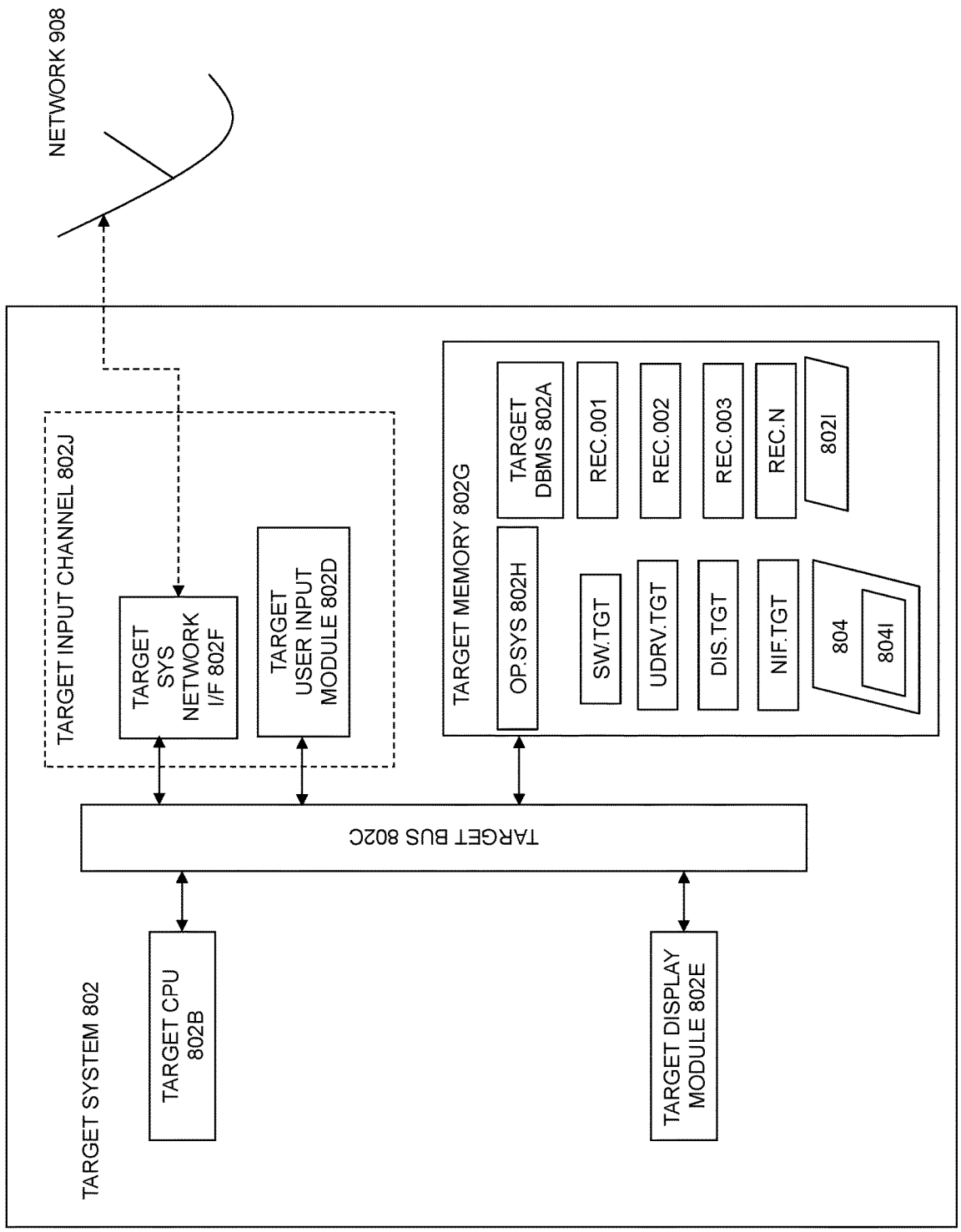
FIG. 9 is a block diagram of the target system of the electronic communications network of FIG. 8.

Referring now generally to the Figures, and particularly to FIG. 9, FIG. 9 is a block diagram of the target system 802 of the electronic communications network 800 of FIG. 8, wherein the target system 802 may comprise: a central processing unit ("CPU") 802B; a user input module 802D; a display module 802E; a software bus 802C bi-directionally communicatively coupled with the CPU 802B, the user input module 802D, the display module 802E; the software bus 802C is further bi-directionally coupled with a network interface 802F, enabling communication with alternate computing devices by means of the electronic communications network 800; and a memory 802G. The target software bus 802C facilitates communications between the above-mentioned components of the target system 802.

It is understood that the input module 802D preferably includes a point and click selection device and/or other suitable visual display element known in the art and an alphanumeric input device comprising a computer keyboard and/or other suitable alphanumeric input or selection device known in the art.

The memory 802G of the target system 802 includes a target software operating system OP.SYS 802H. The target software OP.SYS 802H of the target system 802 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The target memory 802G further includes the target system software program SW.TGT, a target user input driver UDRV.TGT, a target display driver DIS.TGT, and a target network interface drive NIF.TGT. Within the target DBMS 802A hosted by the target system 802 are a plurality of software records REC.001, REC.002, REC.003, and REC.N.

A target system input channel 802J comprises the user input module 802D and network interface 802F.

The exemplary target system software program SW.TGT is optionally adapted to enable the target system 802 to (a.) generate messages and communicate with the archive DBMS 804 and the source server 806, (b.) process communications with and process messages received from the archive DBMS 804 and the source server 806, and (c.) manage the target DBMS 802A to perform, execute and instantiate all elements, aspects and steps as required of the target system 802 to practice the invented method in its various preferred embodiments interaction with the archive DBMS 804 and optionally the source server 806.

Figure 10:
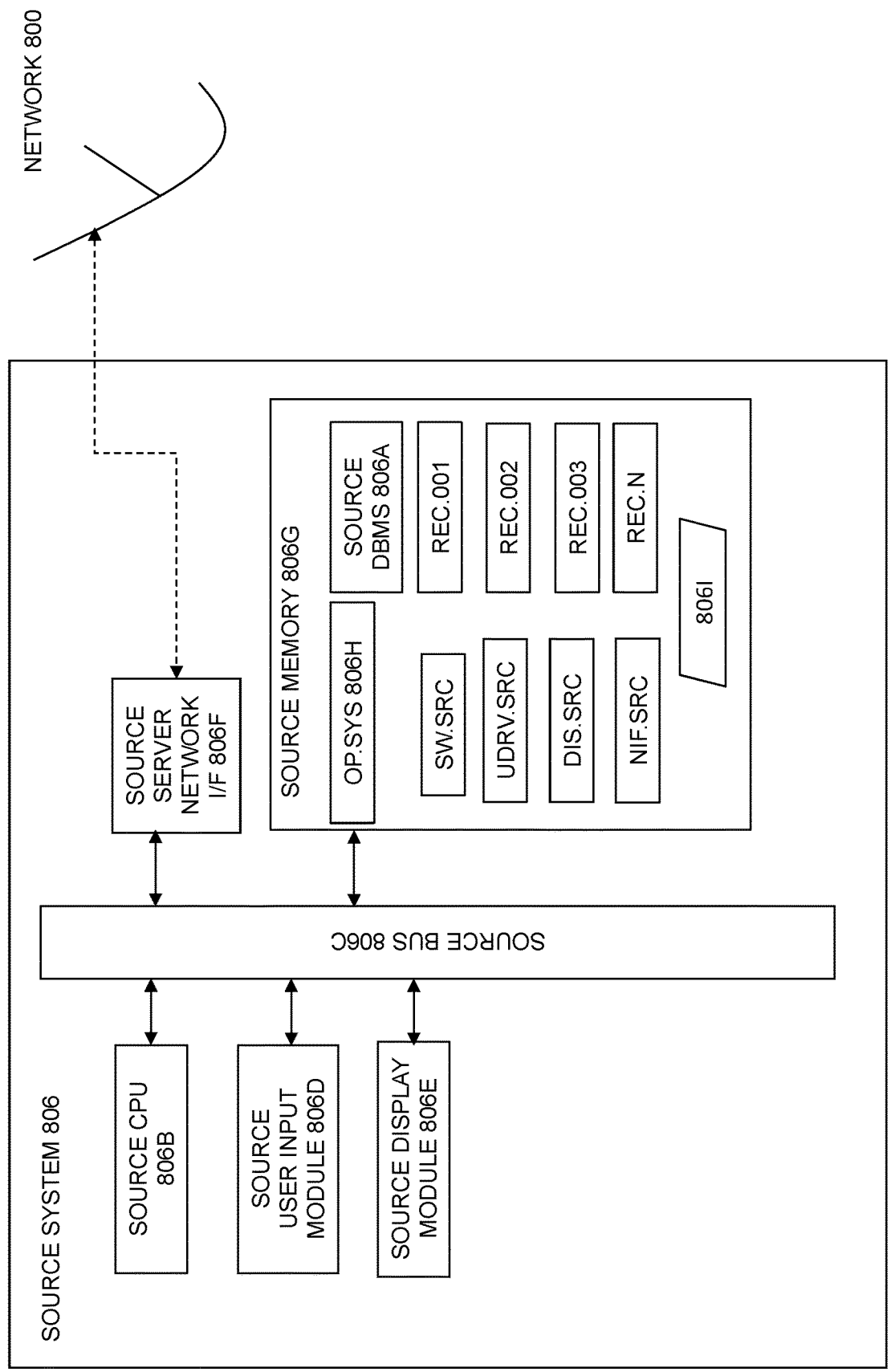
FIG. 10 is a block diagram of the source server of the electronic communications network of FIG. 8.

Referring now generally to the Figures, and particularly to FIG. 10, FIG. 10 is a block diagram of the source server 806 of the electronic communications network 800 of FIG. 8, wherein the source server 806 comprises: a central processing unit ("CPU") 806B; a user input module 806D; a display module 806E; a software bus 806C bi-directionally communicatively coupled with the CPU 806B, the user input module 806D, the display module 806E; the software bus 806C is further bi-directionally coupled with a network interface 806F, enabling communication with alternate computing devices by means of the electronic communications network 800; and a source memory 806G. The source software bus 806C facilitates communications between the above-mentioned components of the source server 806.

The memory 806G of the source server 806 includes a source software operating system OP.SYS 806H. The source software OP.SYS 806H of the source server 806 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, or WINDOWS 8™ operating system as marketed by Microsoft Corporation of Redmond, Wash.; or the MAC OS X operating system or iPhone G4 OS™ as marketed by Apple, Inc. of Cupertino, Calif. The source memory 806G further includes the source system software program SW.SRC, a source user input driver UDRV.SRC, a source display driver DIS.SRC, and a source network interface drive NIF.SRC. Within a source DBMS 806A are a plurality of software records REC.001, REC.002, REC.003, and REC.N.

The exemplary source system software program SW.SRC is optionally adapted to enable the source server 806 to (a.) generate messages and communicate with the archive DBMS 804 and the target system 802, (b.) process communicate with and process messages received from the archive DBMS 804, and the target system 802, and (c.) manage the source DBMS 806A to perform, execute and instantiate all elements, aspects and steps as required of the source server 806 to practice the invented method in its various preferred embodiments interaction with the archive DBMS 804 and the target system 802.

Figure 11A:
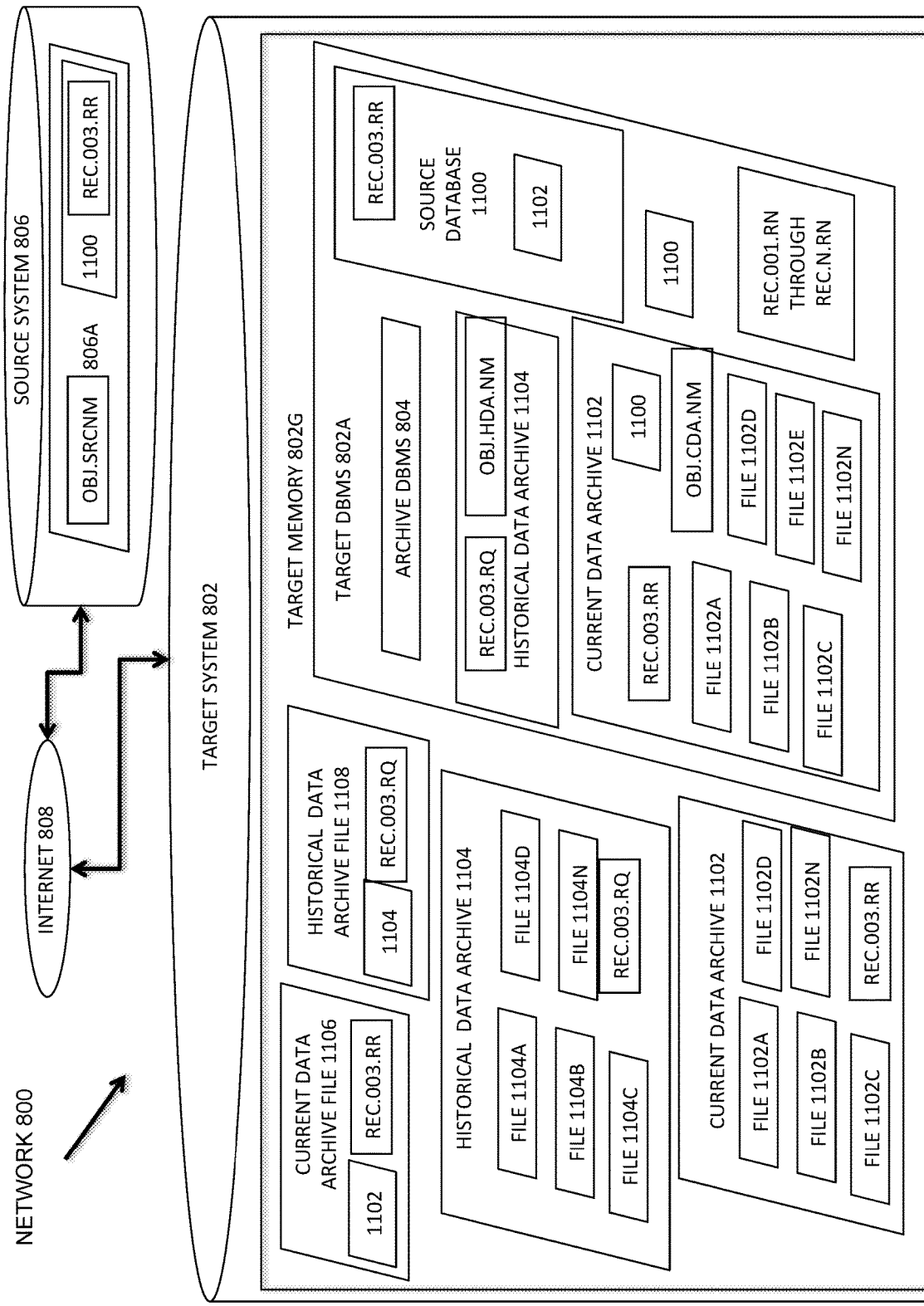
FIG. 11A presents additional optional aspects of the target system of FIG. 8 including a current data archive, a source database and an historical data archive.

Referring now generally to the Figures and particularly to FIG. 11A, FIG. 11A presents additional optional aspects of the target system 802 that enable an alternative preferred embodiment of the invented method (hereinafter, "invented recovery method") that enables point-in-time recovery of information, in whole or in part, (a.) within a cloud-based, i.e., computer networked environment; (b.) found within database; and/or (c.) stored as data within an information technology system or an information technology network.

The target memory 802G stores a source database 1100, a current data archive 1102, and an historical data archive 1104. The source database 1100 is optionally identified by or associated with a source object name OBJ.SRC.NM and/or the source server network address SRC.ADDR, and may additionally optionally or alternatively be stored in the source system 806, the current data archive 1102, and an historical data archive 1104, and/or the target DBMS 802A.

The current data archive 1102 is optionally identified by or associated with a current data archive object name OBJ.CDA.NM and/or the target network address TGT.SRC. The current data archive 1102 may optionally, alternatively or additionally be stored within a current data archive file 1106 and/or be distributively stored within and by a combination of data files 1102A-1102N stored within the target memory 802G and/or the target DBMS 802A.

The historical data archive 1104 may optionally, alternatively or additionally be distributively stored within and by a combination of data files 1104A-1104N stored within the target memory 802G and/or the target DBMS 802A. The historical data archive 1104 may optionally, alternatively or additionally be stored within an historical data archive file 1108 and/or be distributively stored within and by a combination of data files 1104A-1104N stored within the target memory 802G and/or the target DBMS 802A. The historical data archive 1104 is optionally identified by or associated with an historical data archive object name OBJ.HDA.NM and/or the target network address TGT.ADDR.

Figure 11B:
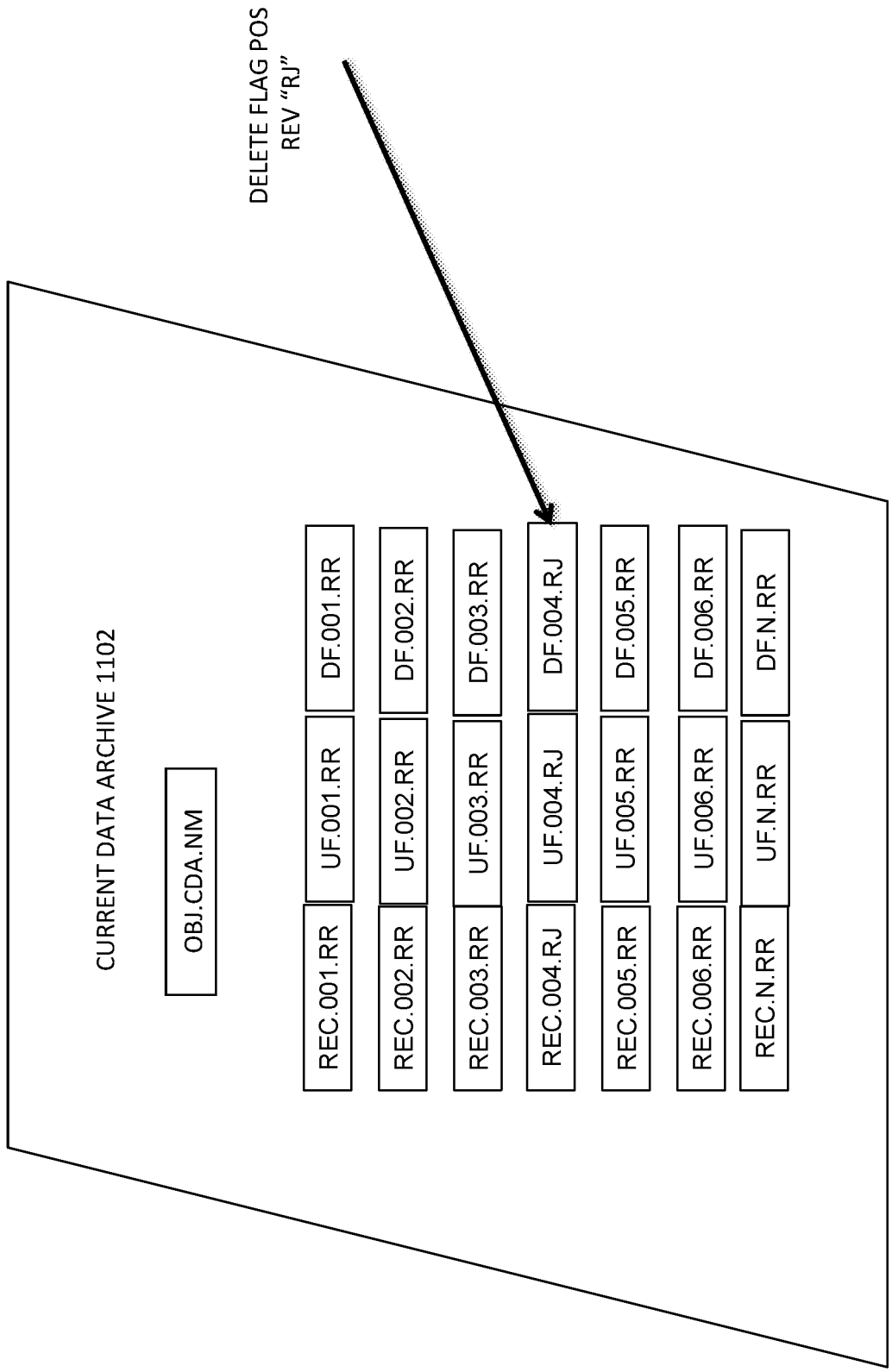
FIG. 11B is a block diagram illustrating the current data archive of FIG. 11A.

Referring now generally to the Figures and particularly to FIG. 11B, FIG. 11B is a block diagram illustrating the current data archive 1102 storing a single version REC.001.RR-REC.003.RR, REC.004.RJ & REC.005-REC.N.RR of each of the records REC.001-REC.N. It is understood that the version designator "RR" indicates that the referenced record version REC.001.RR-REC.003.RR & REC.005-REC.N.RR comprises the most recent record version REC.001.RR-REC.003.RR & REC.005-REC.N.RR held in the source database 1102. It is noted that a delete flag DF.004.RJ of the most recent record version REC.004.RJ is set to a positive value to indicate that the fourth record REC.004 is marked as a deleted record in the current data archive 1102 and that the record version indicator "RJ" indicates that most recent fourth record version REC.004.RJ of the fourth record REC.004 is the record version extant at a time of the marking within the current data archive 1102 of the fourth record REC.004 as deleted.

Figure 11C:
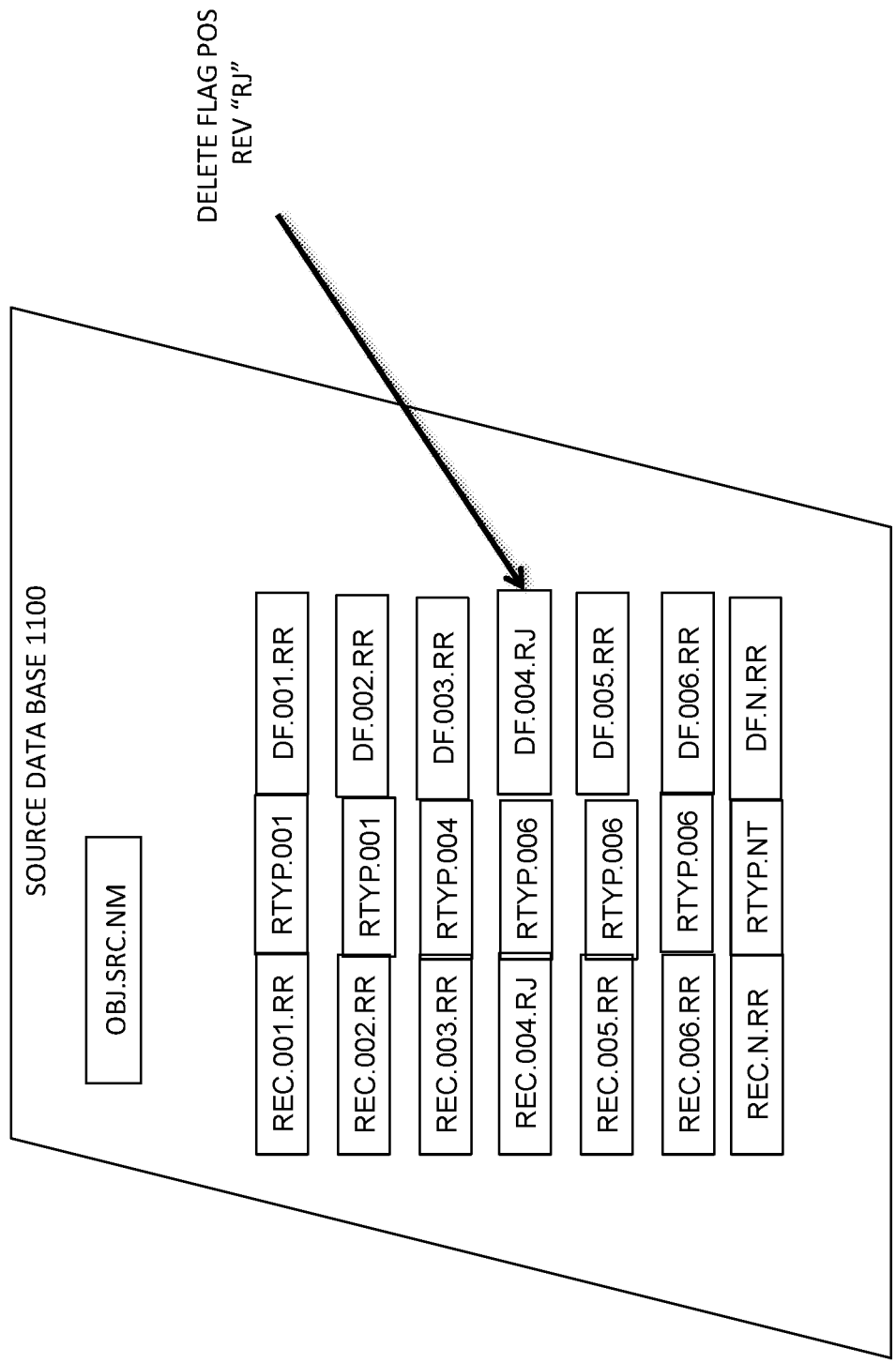
FIG. 11C is a block diagram illustrating the source database of FIG. 11A

Referring now generally to the Figures and particularly to FIG. 11C, FIG. 11C is a block diagram illustrating the source database 1100 storing the current and most recent version REC.001.RR-REC.003.RR & REC.005-REC.N.RR of each of the plurality of records REC.001-REC.003 & REC.005-REC.N. It is understood that the deleted fourth record REC.004 may optionally have been deleted from the source database 1100. Alternatively the RJth final version REC.004.RJ of the fourth record REC.004 may be retained in the source database 1100 and marked as deleted, wherein the delete flag DF.004.RJ of the most recent record version REC.004.RJ is set to a positive value to indicate that the fourth record REC.004 is in a state of deletion.

According to additional optional aspects of the invented recovery method, each revision action of a record REC.001-REC.N is associated with a uniquely generated revision date time stamp REC.001.TDS.R1-REC.N.TDS.RN, wherein each revision date time stamp REC.001.DTS.R1-REC.N.DTS.RN preferably indicates within microseconds the date and time of day that an associated record revision REC.001.R1-REC.N.RN was originated.

According to yet additional optional aspects of the invented recovery method, each record REC.001-REC.N preferably comprises or is associated with a record type indicator RTYP.001-RTYP.NT, wherein the designator "NT" represents and arbitrarily large whole number.

Referring now generally to the Figures and particularly to FIG. 11D, FIG. 11D is a block diagram illustrating the historical data archive 1104 storing a plurality of versions REC.001.RA-REC.N.RQ of each of the records REC.001-REC.N. It is understood that the version designator "RQ" indicates the most recent record version written into the historical data archive 1104, and that the RQth record versions REC.001.RQ-REC.003.RQ & REC.005.RQ-REC.N.RQ are written into the historical data archive 1104 only after the most recent record versions REC.001.RR-REC.003.RR & REC.005-REC.N.RR have been created.

Figure 12:
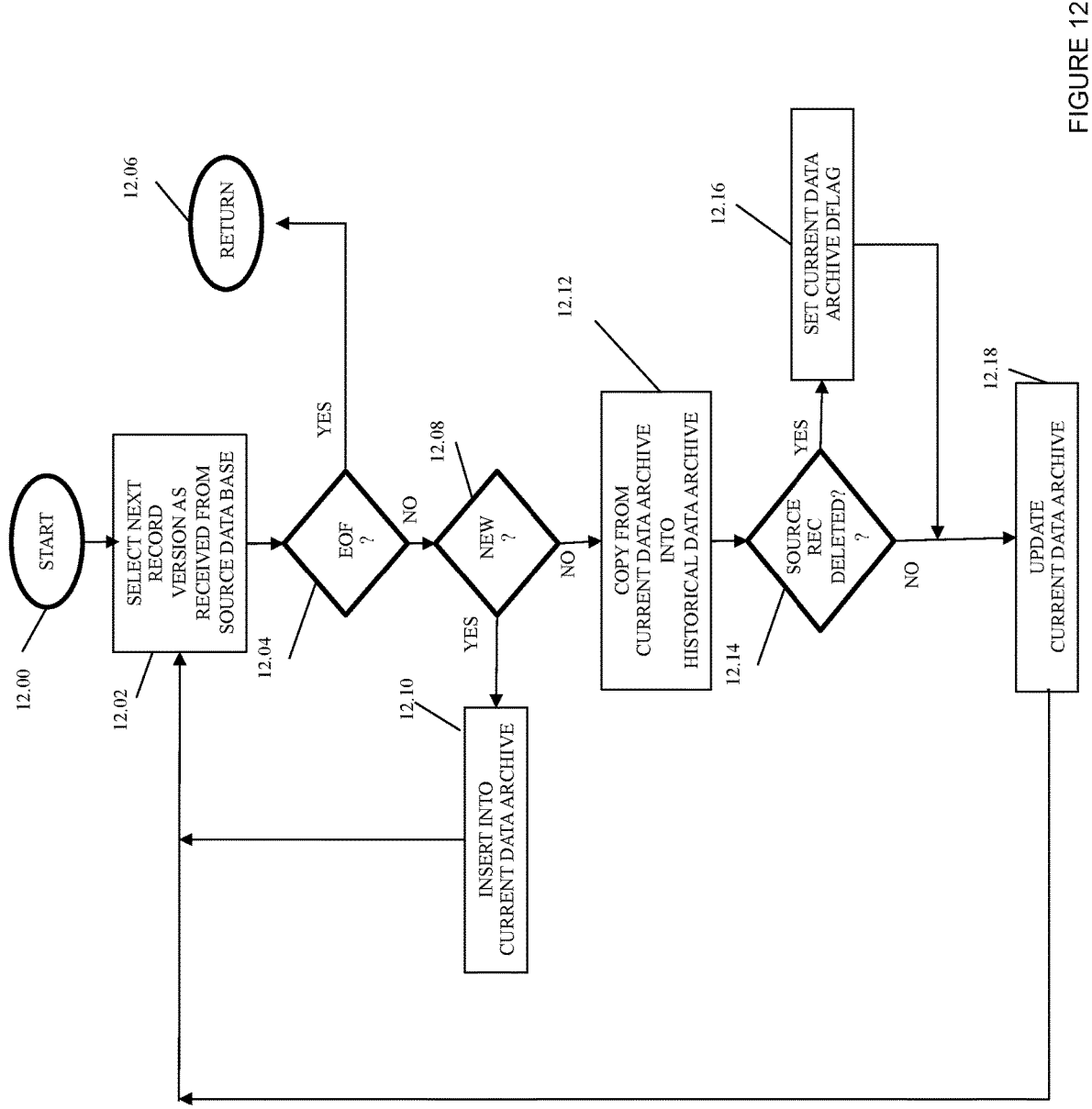
FIG. 12 is a software flowchart of execution of certain aspects of the invented recovery method that comprise a back-up procedure performed by the target system of FIG. 8.

It is further noted that the fourth record versions REC.004.RJ-REC.004.RA of the deleted fourth record REC.004 ends at a final RJth fourth record version REC.004.RA Referring now generally to the Figures and particularly to FIG. 12, FIG. 12 is a software flowchart of execution of certain aspects of the invented recovery method that comprise a back-up procedure performed by the target system 802 as directed by the target system software SW.TGT. The software flowchart of FIG. 12 presents a process of initiation, optional revision, and optional deletion applicable to each software record REC.001-REC.N is illustrated. It is understood that in certain yet alternate preferred embodiments of the invented method where the source database 1100 is stored in the target system 802, the target system software program SW.TGT directs the target system 802 to fully perform the actions specified in the method of FIG. 12.

In step 12.00 the target system 802 is powered up and initiates communication via the network 808 with the source system 806. In step 12.02, the target system 802 receives one or more record versions REC.001.RR-REC.N.RR from the source database 1100, optionally from the source system 806 via the network 808 and optionally in a file (not shown). Alternatively, the source database 1100 may be located within the target system 802 and the one or more record versions REC.001.RR-REC.N.RR received from the source database 1100 in step 12.02 may provided internally within the target system 802 from the source database 1100 and for updating of the current data archive as per steps 12.08 through step 12.18 of the method of FIG. 12.

The target system 802 determines in step 12.04 whether the current data archive 1102 has already been updated with all of the one or more record versions REC.001.RR-REC.N.RR as received from the source database 1100 in the most recent execution of step 12.02. When the target system 802 determines in step 12.04 that the current data archive 1102 has already been updated with all of the one or more record versions REC.001.RR-REC.N.RR as received from the source database 1100 in the most recent execution of step 12.02, the target system 802 proceeds from step 12.04 to step 12.06 and to perform alternative computational and/or communications operations. In the alternative, when the target system 802 determines in step 12.04 that the current data archive 1102 has not yet been updated with all of the one or more record versions REC.001.RR-REC.N.RR as received from the source database 1100 in the most recent execution of step 12.02, the target system 802 proceeds from step 12.04 to step 12.08 and determines if a next record version REC.001.RR-REC.N.RR RR as received from the source database 1100 in the most recent execution of step 12.02 is a new record REC.001-REC.N that has not previously been written into the current data archive 1102.

When the target system 802 determines in step 12.08 that the record version REC.001.RR-REC.N.RR RR selected in the most recent execution of step 12.06 is a new record REC.001-REC.N that has not previously been written into the current data archive 1102, the target system 802 proceeds from step 12.08 to step 12.10 and inserts the record version REC.001.RR-REC.N.RR RR selected in the most recent execution of step 12.02 into the current data archive 1102 and therefrom proceeds onto an additional execution of step 12.02.

In the alternative, when the target system 802 determines in step 12.08 that the record version REC.001.RR-REC.N.RR selected in the most recent execution of step 12.02 is a version of a record REC.001-REC.N that has previously been written into the current data archive 1102, the target system 802 proceeds from step 12.08 to step 12.12 and copies an earlier record version REC.001.RQ-REC.N.RQ as stored in the current data archive 1102 into the historical data archive 1104. The target system 802 proceeds from step 12.12 to step 12.14 and determines if the record version REC.001.RR-REC.N.RR selected in the most recent execution of step 12.02 is marked for deletion. When target system 802 determines in step 12.14 that the record version REC.001.RR-REC.N.RR selected in the most recent execution of step 12.02 is marked for deletion, the target system 802 proceeds on to step 12.16 sets the delete flag DF.001-DF.N of the record version REC.001.RR-REC.N.RR selected in the most recent execution of step 12.02 to a value indicating that the comprising and/or associated record REC.001-REC.N is in a state of deletion.

The target system 802 proceeds from either step 12.14 or step 12.16 and to step 12.18 to update the current record archive 1102 with the record version REC.001.RR-REC.N.RR selected in the most recent execution of step 12.02, and therefrom proceeds onto an additional execution of step 12.02

For the purposes of clarity of explanation, an exemplary third record REC.003 will be discussed in the following narrative in order to explain the invented back up and recovery method, wherein this explanatory focus on the third record REC.003 is neither meant to be nor offered as a limitation of the scope of the invention. In addition, for the purposes of clarity of explanation, the exemplary third record REC.003 will be discussed in the following narrative in the context of the source system 806 storing the source database 1100 within the source system DBMS 806A from where the records are created, updated and deleted as directed by the source system software program SW.SRC and wherein additional operations performed by the target system 802 are directed by the target system software SW.TGT. In addition, for the purposes of clarity of explanation, the exemplary third record REC.003 will be discussed in the following narrative in the context of the source system 806 storing the source database 1100 within the source system DBMS 806A from where the records are created, updated and deleted as directed by the source system software program SW.SRC and wherein additional operations performed by the target system 802 as directed by the target system software program SW.TGT. It is understood that in certain yet alternate preferred embodiments of the invented method where the source database 1100 is stored in the target system 802, the target system software program SW.TGT directs the target system 802 to fully perform the actions specified in the method of FIG. 12. In this exemplary narrative of certain aspects of the invented recovery method, after the receipt and selection by the target system 802 in step 12.02 of a first instantiation of the third record REC.003, i.e., the first version of the third record REC.003.RA, wherein the current data archive 1102 at this point in time has no record of receipt of any version of the third record REC.003, the first version of the third record REC.003.RA is inserted into the current data archive in step 12.10.

Upon a later receipt and selection by the target system 802 in step 12.02 of a succeeding "RBth" third record version REC.003.RB, the target system 802 proceeds from step 12.08 to step 12.12, wherein the earlier received first version of the third record REC.003.RA is written from the current data archive 1102 and into the historical data archive 1104, and thereafter the current data archive 1102 is updated with the newly received RBth third record version REC.003.RB in step 12.18.

It is understood that when the target system 802 determines in step 12.14 that the RBth third record version REC.003.RB is in a state of deletion, the delete flag of the RBth third record version REC.003.RB is set to a positive state in step 12.16 to indicate that the RBth third record version REC.003.RB is deleted.

As additional revisions of the third record REC.003.RA-REC.003.RN are generated, wherein "RN" represents an arbitrarily large whole number, each new revision is sequentially written first into the current data archive 1102 and then, upon receipt of a succeeding record version, REC.003.RA-REC.003.RN, into the historical data archive 1104. It is understood that preferably the current data archive 1102 stores only the most recent version of any record REC.001-REC.N, and all previous record versions REC.001.RA-REC.N.RN of a revised record REC.001-REC.N are updated within the current data archive 1102 when a newer record version REC.001.V0-REC.N.RN is received by the current data archive 1102 from the source database 1100. However, the historical data archive 1104 maintains storage of all record versions REC.001.RA-REC.N.RN received by the historical data archive 1104.

According to the invented recovery method, a user or an automated process may direct the target system 802 to perform a record recovery and including one or more of the following aspects: (a.) select all record versions REC.001.RA-REC.N.RN of each record REC.001-REC.N that are associated with a date time stamp value (a.) that is earlier than a specified point-in-time value, and (b.) closest to that specified point-in-time value REC.001.RA-REC.N.RN than any other version of a same record REC.001-REC.N.

In describing additional optional aspects of the invented recovery method, versions REC.003.RA-REC.003.RM of the exemplary third record REC.003 will be addressed for the sake of clarity of explanation and not to indicate any limitations on the scope of the invented method. It is understood that designator "RR" indicates a revision or a record REC.001-REC.N of a most recently record version RA-RN of a record REC.001-REC.N received by the target system 802, and further that the designator "RQ" will indicate a next most recently record version RA-RN of a record REC.001-REC.N received by the target system 802.

Figure 13:
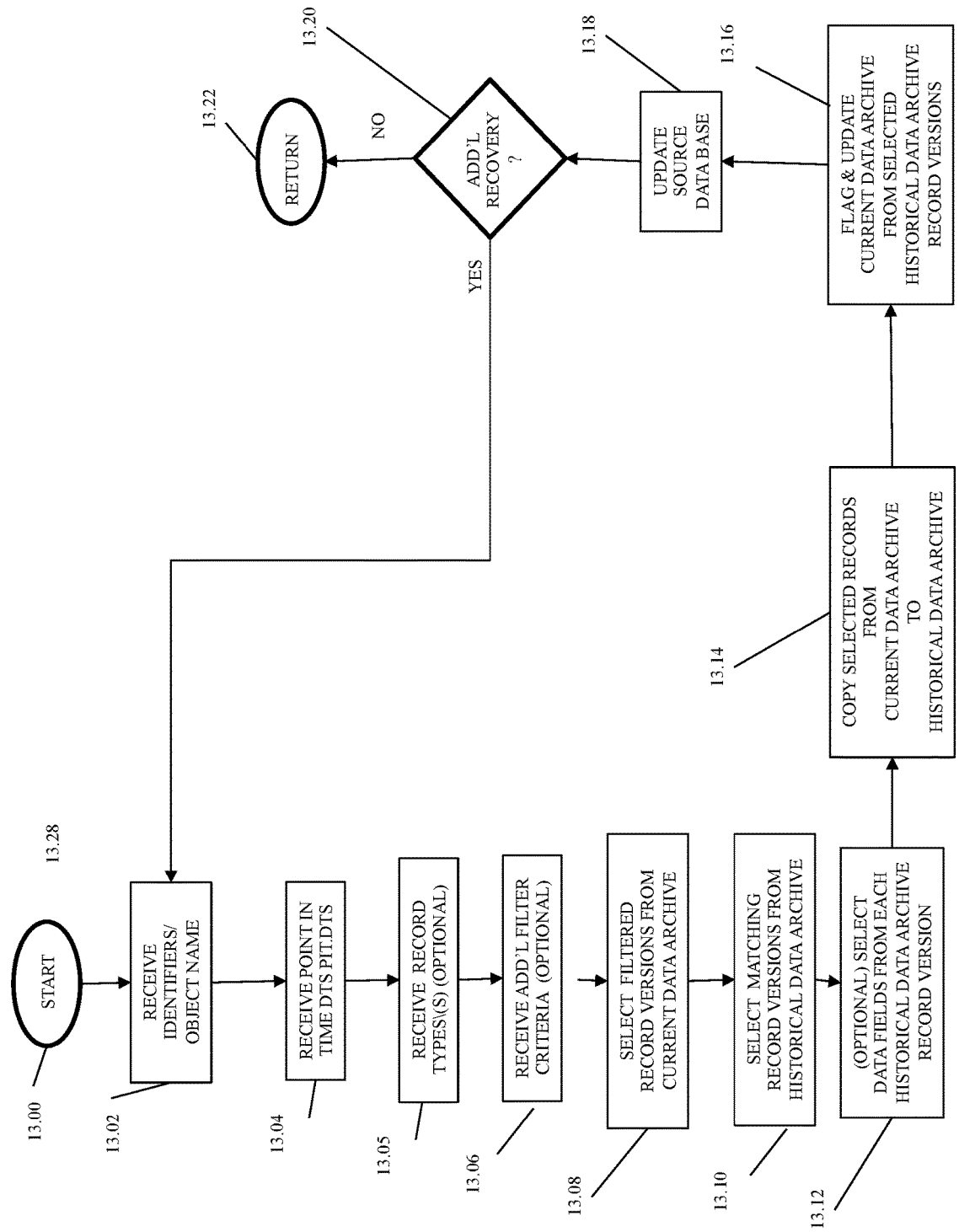
FIG. 13 is a software flowchart of execution of certain additional data record version recovery aspects of the invented recovery method that comprise a back-up procedure performed by the target system of FIG. 8.

Referring now generally to the Figures and particularly to FIG. 13, and further in the spirit of clarity of explanation, a scenario is offered as shown in FIGS. 11A through 11D, wherein a plurality of third record versions REC.003.RA-REC.003.RQ are stored in the historical data archive 1104 and a most recent "RRth" third record version REC.003.RR is stored in both the current data archive 1102 and the source database 1100. It is understood that FIG. 13 is a software flowchart of execution of certain aspects of the invented recovery method that comprise a recovery procedure performed by the target system 802 as directed by the target system software SW.TGT.

In step 13.00 the target system 802 is powered up and initiates communication via the network 808 with the source system 806, and determines in step 13.20 whether a command has been received to initiate a point-in-time recovery process of steps 13.02 through 13.20. In optional step 13.02, the target system 802 access and/or receives via the input channel 802J (a.) a source object name OBJ.SRC.NM and/or the source network address SRC.ADDR that identifies or is associated with the source database 1100 that contains a plurality of records REC.001-REC.N and or a plurality of record identifiers REC.ID.001-REC.N; and/or (b.) the target system network address TGT.ADDR that identifies or is associated with the current data archive object 1102 and/or the historical data archive 1104, and/or (i.) the current data archive object name OBJ.CDA.NM and/or (ii.) the historical data archive object name OBJ.HDA.NM.

In step 13.02 the target system 802 optionally populates the exemplary first filter criteria record REC.CRT.001 and/or filter criteria records of data structure known in the art with the source object name OBJ.SRC.NM, the source network address SRC.ADDR, the target system network address TGT.ADDR, the current data archive object name OBJ.CDA.NM and/or the historical data archive object name OBJ.HDA.NM; these network addresses SRC.ADDR & TGT.ADDR and object names OBJ.SRC.NM, OBJ.CDA.NM & OBJ.HDA.NM are optionally applied in one or more of steps 13.08 through 13.18 to determine and apply the source and destination of data record versions REC.001.RA-REC.N.RR in accordance with one or more aspects of the method of the present invention as disclosed herein.

In step 13.04, the target system 802 receives via the input channel 802J an exemplary first point-in-time date time stamp data PIT.DTS.RCV.001. The target system 802 optionally populates the exemplary first filter criteria record REC.CRT.001 and/or filter criteria records of data structure known in the art with the first point-in-time date time stamp data PIT.DTS.RCV.001 received in step 13.04.

In optional step 13.05, the target system 802 receives via the input channel 802J one or more record type identifiers RTYP.001-RTYP.RT to be applied as filter criteria in one or more of steps 13.08 through 13.18. The target system 802 optionally populates the exemplary first filter criteria record REC.CRT.001 and/or filter criteria records of data structure known in the art with the record type identifiers RTYP.001-RTYP.RT received in step 13.05.

In optional step 13.06, the target system 802 receives via the input channel 802J one or more additional filter criteria, such as one time ranges of time date stamps of record versions REC.001.RA-REC.N.RQ N, and optionally populates the exemplary first filter criteria record REC.CRT.001 and/or filter criteria records of data structure known in the art with the filter criteria received in step 13.06.

In step 13.08 the target system 802 selects records REC.001-REC.N from the current data archive 1102 in accordance with the filter criteria received in steps 13.02, 13.04, 13.05 and 13.06. In step 13.10 the target system 802 selects record versions REC.001.RA-REC.N.RQ from the historical data archive that meet the criteria of both (a.) being earlier received versions RA-RQ of the records REC.001-REC.N selected from the current data archive 1102; and (b.) are each associated with a record version time date stamp that is both (1.) earlier than the first point-in-time date time stamp data PIT.DTS.RCV.001 received in step 13.04, and (2.) closer in time displacement value than any other record version time date stamp of all versions RA-RR of a same record REC.001-REC.N.

In optional step 13.12, selected information is copied from the record versions REC.001.RA-REC.N.RQ selected in step 13.10 and written into newly formed record versions REC.001.RQ'-REC.N.RQ', whereby the newly formed record versions REC.001.RQ'-REC.N.RQ' are partially updated record versions and have unique content.

In step 13.14 the record versions REC.001-REC.N.RR selected in step 13.08 from the current data archive 1102 are written into the historical data archive 1102. In step 13.16, record versions REC.001.RA-REC.N.RQ selected in step 13.10, and/or optionally partially updated record versions REC.001.RQ'-REC.N.RQ' generated in step 13.12, are written into the current data archive 1102 from the historical data archive 1104, and one or more recovery status field flags (hereinafter, "the update flags") UF.001.RA-UF.N.RQ & UF.001.RQ'-UF.N.RQ' are set to a value indicating that the source database 1100 shall be updated with the record versions REC.001.RA-REC.N.RQ selected in step 13.10, and/or optionally partially updated record versions REC.001.RQ'-REC.N.RQ' generated in step 13.12.

In step 13.18 the source database 110 is updated with the record versions REC.001.RQ-REC.N.RQ & REC.001.RQ'-REC.N.RQ' as updated into the current data archive 1102 in step 13.16, wherein the record versions REC.001.RQ-REC.N.RQ & REC.001.RQ'-REC.N.RQ' updated into the current data archive 1102 in step 13.16 may be uploaded to the source database 1100 of the source system 806 via the network 800. The target system 802 determines in step 13.20 whether an additional command has been received to initiate a point-in-time recovery process of steps 13.02 through 13.20. When the target system 802 determines in step 13.20 that an additional command has been received by the target system 802 to initiate a point-in-time recovery process, the target system 802 proceeds from step 13.20 to a succeeding execution of step 13.02. In the alternative, When the target system 802 determines in step 13.20 that an additional command has not been received by the target system 802 to initiate a point-in-time recovery process, the target system 802 proceeds on to step 13.22 and to perform alternative computational and/or communicative actions.

Referring now generally to the Figures and particularly to FIG. 14A, FIG. 14A is a block diagram of aspects and elements of an exemplary RQth third record version REC.003.RQ including an RQth third record version identifier REC.ID.003.RQ, an RQth third record version time date stamp TDS.003.RQ associated with a generation of the RQth third record version REC.003.RQ, an RQth third record data element DATA.003.RQ, an RQth third record update flag UF.003.RQ that indicates whether the RQth third record version REC.003.RQ is marked for updating in the current data archive 1102 and/or the source database 1100, and an RQth third record version delete flag DF.003.RQ is marked as indicating that the third record REC.003 is marked as being in a state of deletion.

It is understood that the remaining record versions REC.001.RA-REC.N.RN & REC.003.RQ' contain one or more appropriate and relevant alternate elements such as, an RQth third record version identifier REC.ID.001.RQ-REC.ID.001.RQ & REC.ID.001.RQ', a record version time date stamp TDS.001.RA-TDS.N.RQ & TDS.RA.Q' associated with a generation of the comprising additional record versions TDS.001.RA-TDS.N.RQ & TDS.RA.Q', a record data DATA.001.RA-DATA.N.RQ & DATA.RA.Q', a record update flag UF.001.RA-UF.N.RQ & UF.RA.Q' that indicates whether the comprising record version REC.001.RA-REC.N.RN & REC.003.RQ' is marked for updating in the current data archive 1102 and/or the source database 1100, and a record delete flag DF.0012.RA-DF.N.RN & DF.003.RQ' is marked as indicating that the comprising record REC.001-REC.N & REC.RQ' is marked as being in a state of deletion.

Referring now generally to the Figures and particularly to FIG. 14B, FIG. 14B is a block diagram of aspects and elements of the RRth third record version REC.003.RR including an RRth third record version identifier REC.ID.001.RR, an RRth third record version time date stamp TDS.003.RR associated with a generation of the RRth third record version REC.003.RR, an RRth third record data element DATA.003.RR, an RRth third record update flag UF.003.RR that indicates whether the RRth third record version REC.003.RR is marked for updating in the current data archive 1102 and/or the source database 1100, and an RRth third record version delete flag DF.003.RR is marked as indicating that the third record REC.003 is marked as being in a state of deletion.

Referring now generally to the Figures and particularly to FIG. 14C, FIG. 14C is a block diagram of aspects and elements of the RQ'th third record version REC.003.RQ' as generated in step 13.12 of the method of FIG. 13. Certain aspects and elements of the RQ'th third record version includes an RQ'th third record version identifier REC.ID.001.RQ', the earlier generated RQth third record version identifier REC.ID.001.RQ, an RQ'th third record version time date stamp TDS.003.RQ' associated with a generation of the RQ'th third record version REC.003.RQ', the earlier generated RQth third record version time data stamp REC.003.RQ, an RQ'th third record data element DATA.003.RQ', an RQ'th third record update flag UF.003.RQ' that indicates whether the RQ'th third record version REC.003.RQ' is marked for updating in the current data archive 1102 and/or the source database 1100, and an RQ'th third record version delete flag DF.003.RQ' is marked as indicating that the third record REC.003 is marked as being in a state of deletion.

Referring now generally to the Figures and particularly to FIG. 15A, FIG. 15A is a block diagram of aspects and elements of an exemplary first workflow record WFREC.001 that includes a first workflow record identifier WFRECID.001 plurality of record version identifiers REC.ID.001.RQ-REC.ID.N.RQ. It is understood that the exemplary first workflow record WFREC.001 is preferably generated and populated in the execution of step 13.10 and optionally updated in step 13.12 to include references to any record versions REC.003.RQ' generated in the execution of step 13.12. It is further understood that the exemplary first workflow record WFREC.001 is preferably applied (1.) in the execution of step 13.14 to direct the target system 802 to select record versions REC.001.RR-REC.N.RR to be written into the historical data archive 1104; (2.) in the execution of step 13.16 to direct the target system 802 to select record versions REC.001.RR-REC.N.RR to be update the current data archive 1104; (3), and in step 13.18 to update the records REC.001-REC.N of the source database 1100.

Referring now generally to the Figures and particularly to FIG. 15B, FIG. 15B is a block diagram of aspects and elements of an exemplary second workflow record WFREC.002 that includes a second workflow record identifier WFREC.ID.002, a plurality of record versions REC.001.RQ-REC.N.RQ. It is understood that the exemplary second workflow record WFREC.002 is preferably generated and populated in the execution of step 13.10 and optionally updated in step 13.12 to include references to any record versions REC.003.RQ' generated in the execution of step 13.12. It is further understood that the exemplary second workflow record WFREC.002 is preferably applied (1.) in the execution of step 13.14 to direct the target system 802 to select record versions REC.001.RR-REC.N.RR to be written into the historical data archive 1104; (2.) in the execution of step 13.16 to direct the target system 802 to select record versions REC.001.RR-REC.N.RR to be update the current data archive 1104; (3), and in step 13.18 to update the records REC.001-REC.N of the source database 1100.

Referring now generally to the Figures and particularly to FIG. 15C, FIG. 15C is a block diagram of aspects and elements of an exemplary first workflow record message WFREC.MSG.001 that may be generated by the target system 802 and transmitted via the network 800 and applied in step 13.18 to update the source database 1100. The exemplary first workflow record message WFREC.MSG.001 preferably includes a first workflow record message identified WFREC.MSG.ID.001, the source database network address SDB.ADDR of the source database system 806 as the addressee address, the target system network address TDGT.ADDR of the target system 802 as the sender address, the first workflow record WFREC.001 and/or the second workflow record WFREC.002, and optionally copies of version records REC.001.RQ-REC.N.RQ applied in step 13.16 to update the current data archive 1102.

Referring now generally to the Figures and particularly to FIG. 16A through FIG. 18C, FIG. 16A through FIG. 18C present particular and varied states of the network 800, to include the source system 806 and the target system 802, as well as the states and locations of instantiations the record versions REC.001.RA-REC.N.RQ' shown in relation to the operation of the method of FIG. 13 and the invented recovery method.

Figure 16A:
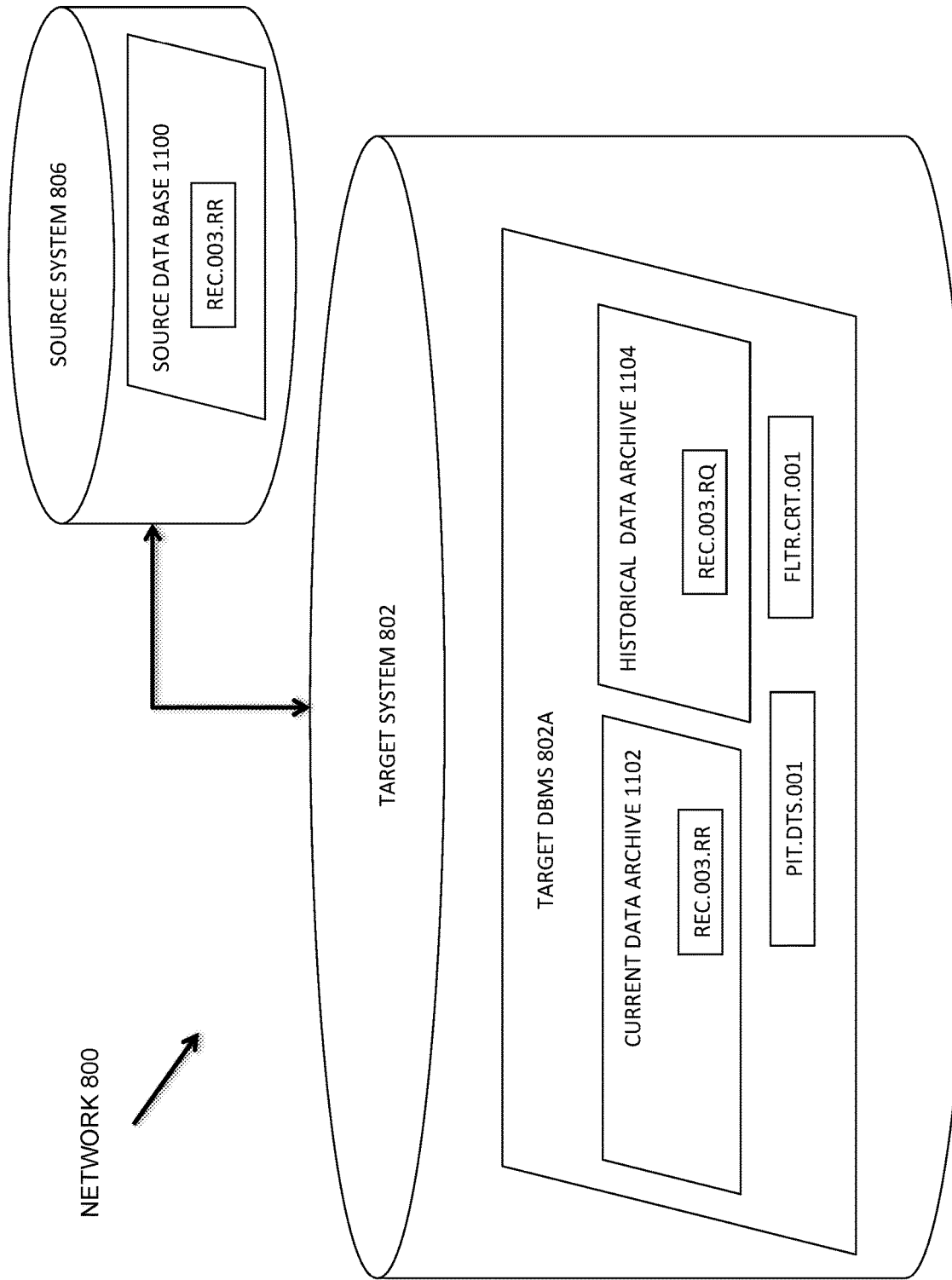
FIG. 16A is a block diagram of the network of FIG. 8 in an exemplary first processing state

Referring now generally to the Figures and particularly to FIG. 16A, FIG. 16A is a block diagram of the network 800 in an exemplary first processing state, wherein instantiations of the most recently generated version of the third record REC.003.RR, i.e., the "RRth" version of the third record REC.003.RR, are stored both within the source database 1100 and within the current data archive 1102. An instantiation of the earlier generated RQth third record version REC.003.RQ is stored within historical data archive 1104. An exemplary first point-in-time date time stamp PIT.DTS.001 received by the target system 802 in an execution of step 13.04 is stored in the target DBMS 802A. An exemplary first criteria FLTR.CRT.001 received by the target system 802 in an execution of step 13.06 is stored in the target DBMS 802A.

It is understood that the (a.) RQth third record version REC.003.RQ satisfies the first filter criteria, and (b.) the numerical value of RQth date time stamp REC.003.DTS.RQ of the RQth third record version REC.003.RQ indicates both (i.) a time earlier than the numerical value of the first point-in-time date time stamp PIT.DTS.001, and (b.) is the closer to the numerical value of the first point-in-time date time stamp PIT.DTS.001 than any other third record version date time stamp TDS.003.RQ-TDS.003.RA indicating a time earlier than the first point-in-time date time stamp PIT.DTS.001.

Figure 16B:
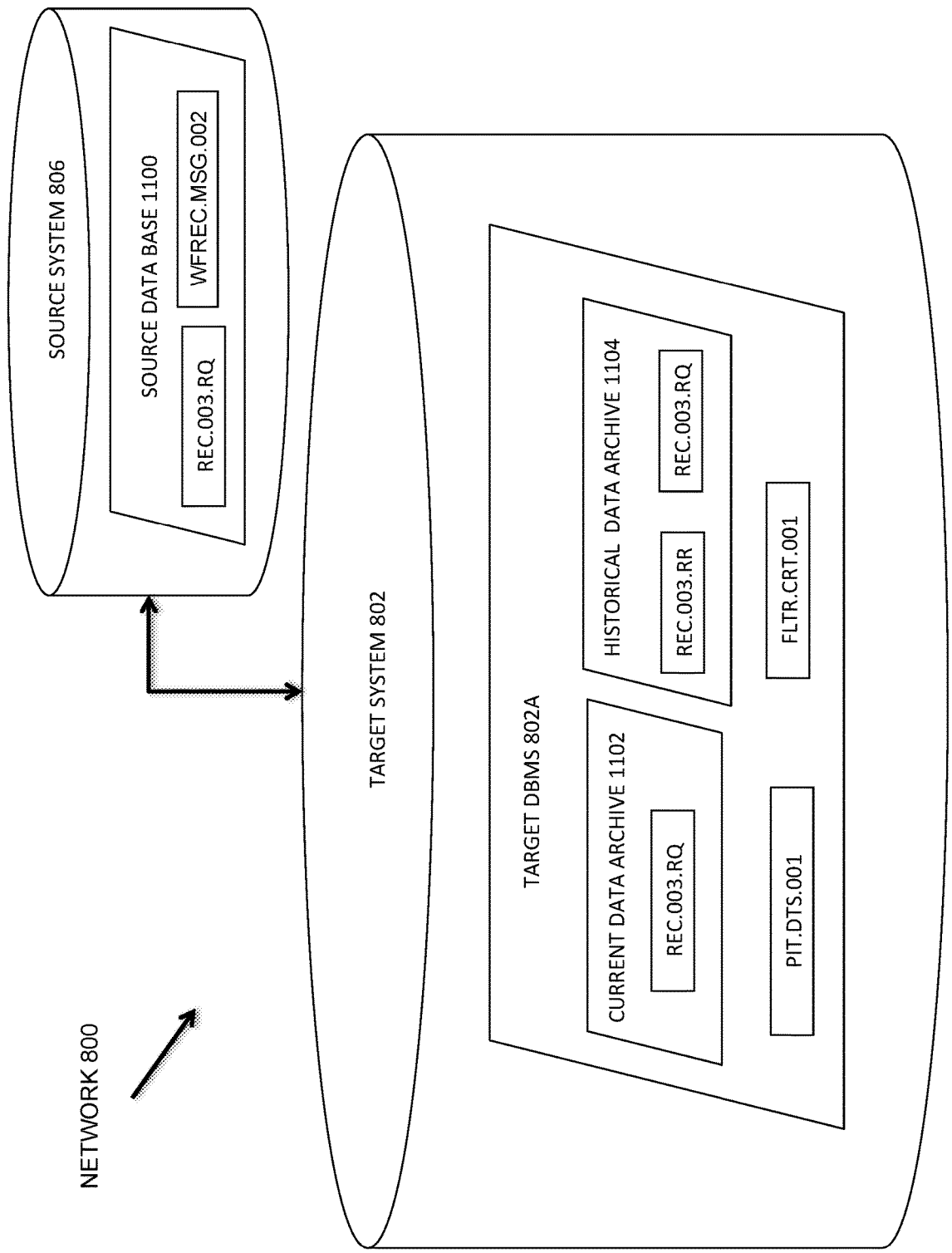
FIG. 16B is a block diagram of the network of FIG. 8 in an exemplary second processing state succeeding the first state of FIG. 16A.

Referring now generally to the Figures and particularly to FIG. 16B, FIG. 16A is a block diagram of the network 800 in a succeeding exemplary processing state, wherein the aspects of the invented recovery method of FIG. 13 steps 13.02 through 13.20 have been applied to the network 800 in the state of FIG. 16A. In accordance with an application of the method of FIG. 13, FIG. 16B shows the source database 1100 updated with the RQth version of the third record REC.003.RQ, the current database 1102 also updated with the RQth version of the third record REC.003.RQ, and the historical data archive 1104 updated by an addition of an instantiation of the RRth version of the third record REC.003.RR. It is understood that the second workflow record message WFREC.MSG.002 was generated in an instantiation step 13.15 by the target system 802 and provided to the source system 806 in a succeeding instantiation of step 13.18.

Figure 17A:
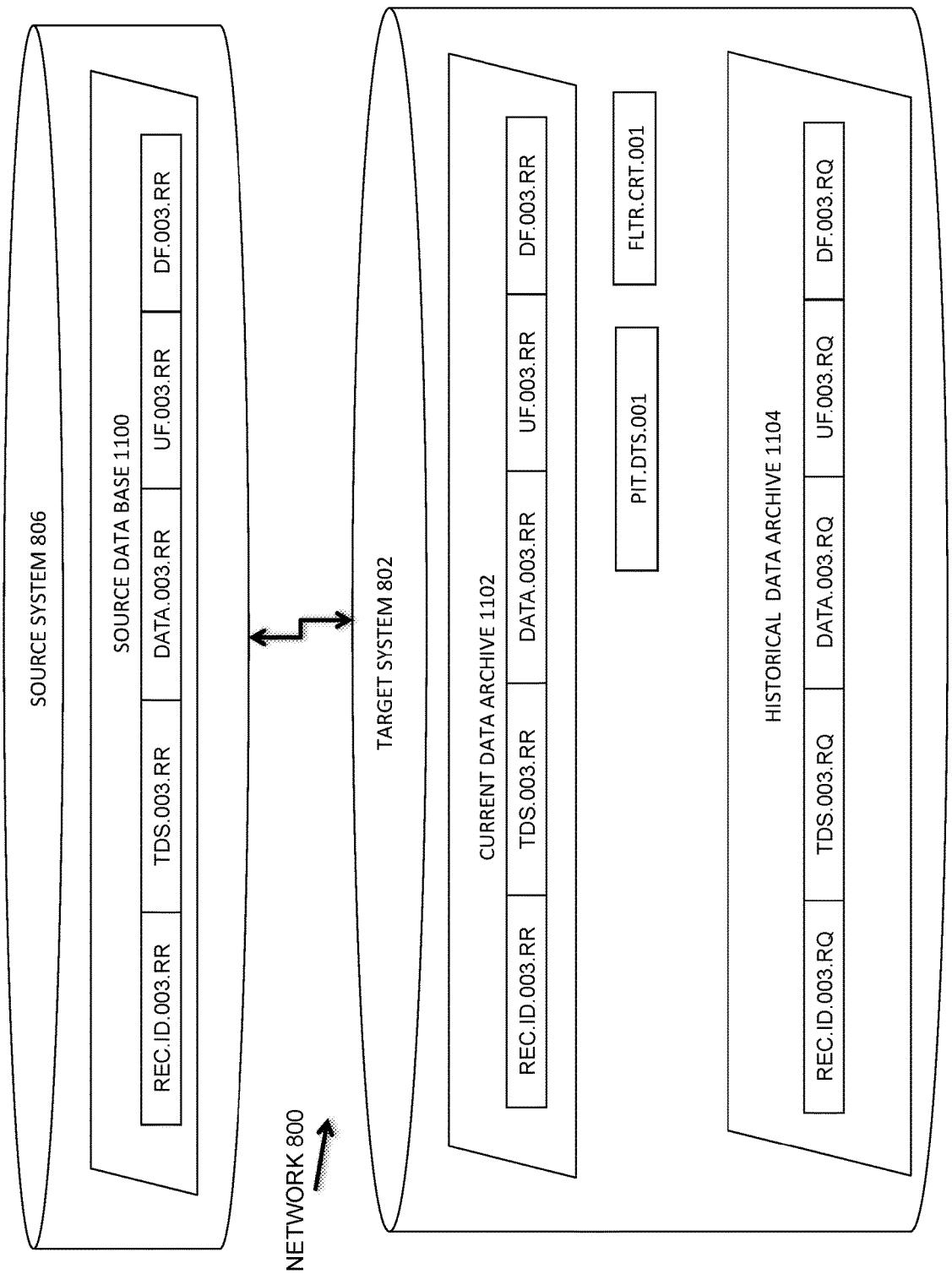
FIG. 17A is a more detailed block diagram of the network 800 in the exemplary processing state as shown in FIG. 16A.

Referring now generally to the Figures and particularly to FIG. 17A, FIG. 17A is a more detailed block diagram of the network 800 in the exemplary processing state as shown in FIG. 16A. For the sake of clarity of explanation, it is supposed that the network 800 is in the exemplary processing state at an instance of execution of step 13.06, wherein the first point-in-time date time stamp PIT.DTS.001 has been received by the target system 802 in a previous instantiation of step 13.04, and the exemplary first filter criteria FLTR.CRT.001 has been received by the target system 802 in a previous instantiation of step 13.06.

Figure 17B:
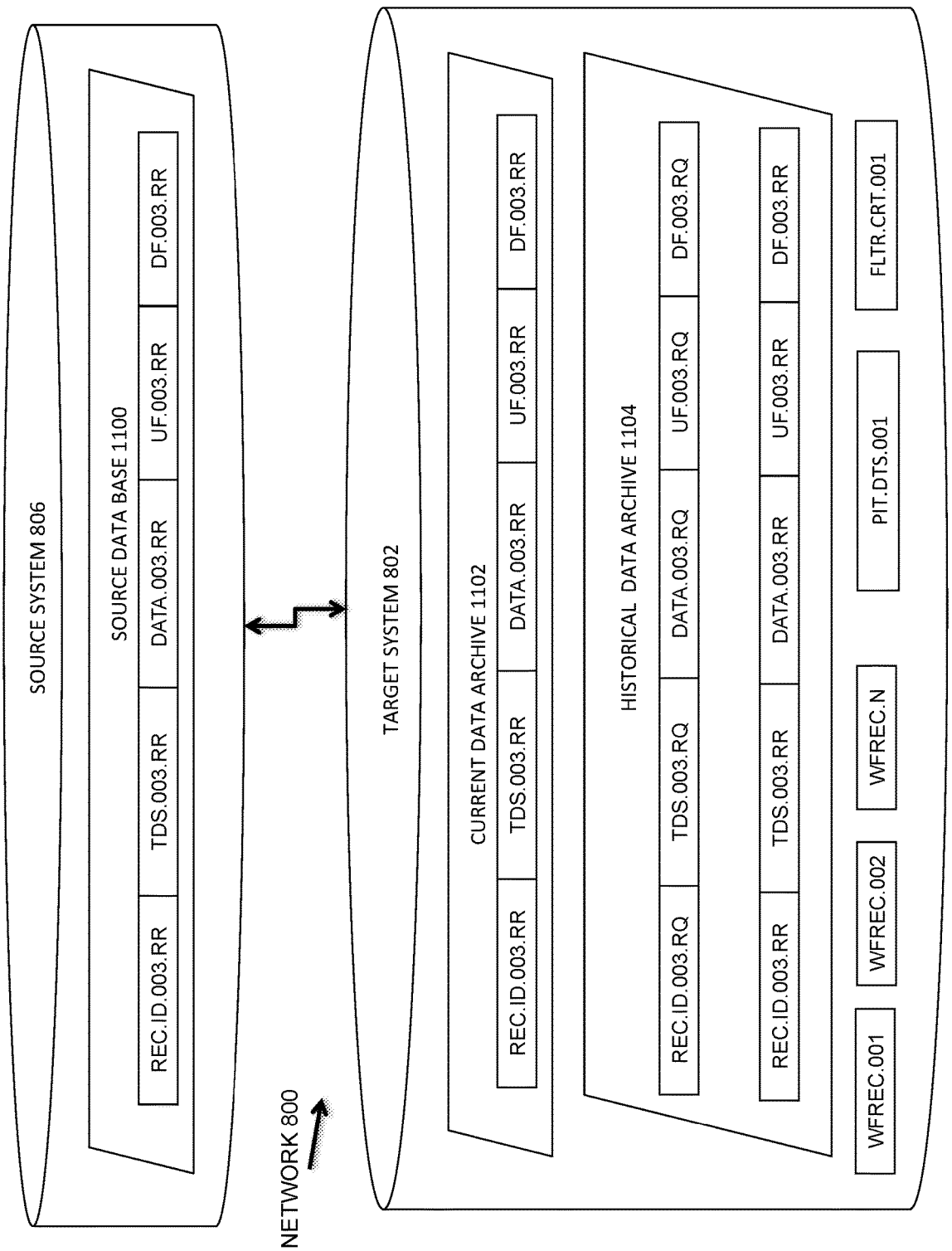
FIG. 17B is a detailed block diagram of the network of FIG. 8 in an exemplary second processing state succeeding the exemplary processing state as shown in FIG. 17A.

Referring now generally to the Figures and particularly to FIG. 17B, FIG. 17B is a detailed block diagram of the network 800 in an exemplary second processing state succeeding the exemplary processing state as shown in FIG. 17A. For the sake of clarity of explanation, it is supposed that the network 800 is in the exemplary processing state occurring after an instance of execution of step 13.14, wherein the first workflow record WFREC.001 and/or the second workflow record WFREC.002 or an additional Nth workflow record WFREC.N were generated in step 13.10 and applied in step 13.14. It is understood that the historical data record 1104 is shown as having been updated with the RRth third record version REC.003.RR in step 13.14.

Figure 17C:
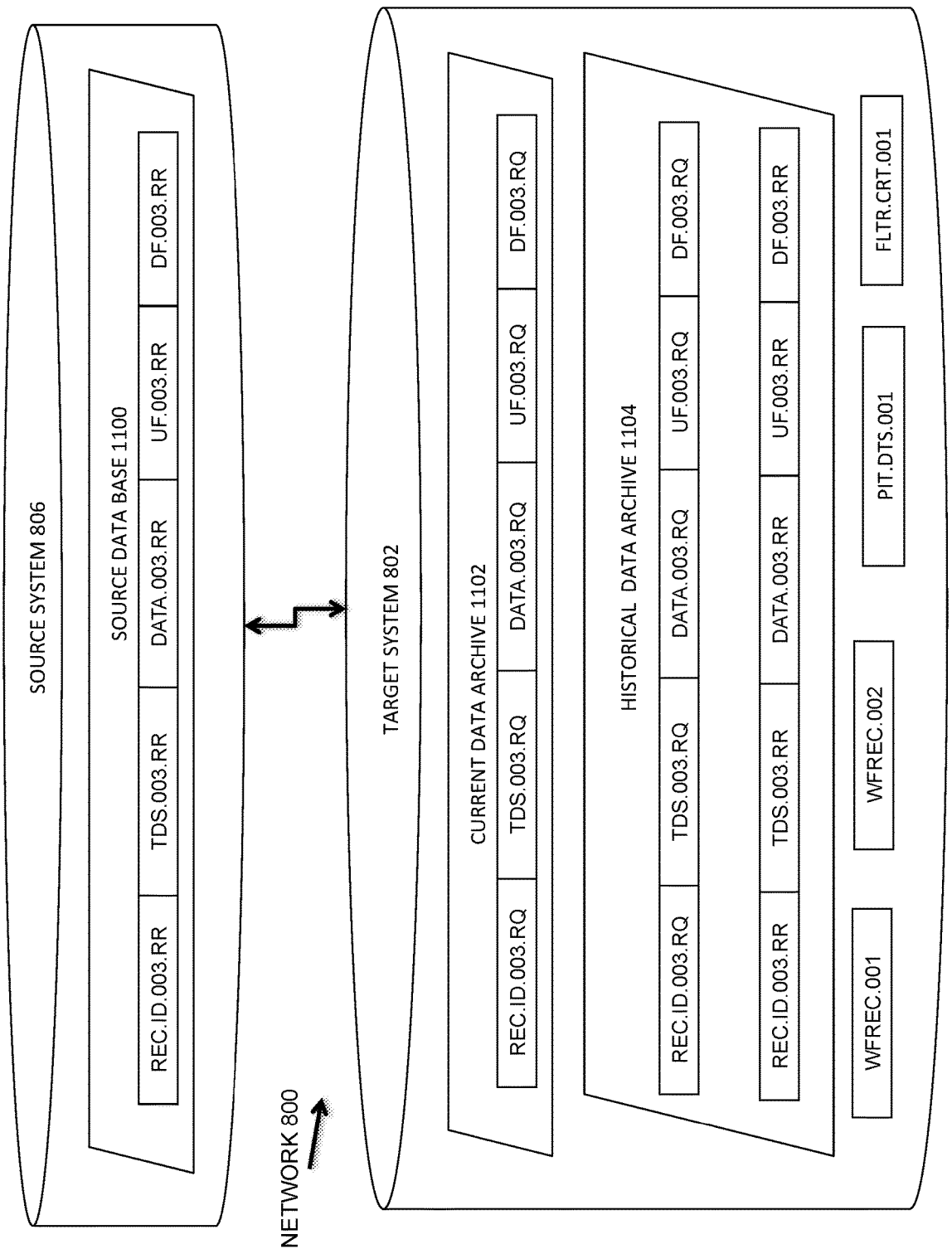
FIG. 17C is a detailed block diagram of the network of FIG. 8 in an exemplary third processing state succeeding the exemplary second processing state as shown in FIG. 17B.

Referring now generally to the Figures and particularly to FIG. 17C, FIG. 17C is a detailed block diagram of the network 800 in an exemplary third processing state succeeding the exemplary second processing state as shown in FIG. 17B. For the sake of clarity of explanation, it is supposed that the network 800 is in the exemplary processing state occurring after an instance of execution of step 13.16, wherein the historical data record 1104 has been updated with the RQth third record version REC.003.RR in accordance with the first workflow record WFREC.001 and/or the second workflow record WFREC.002.

Figure 17D:
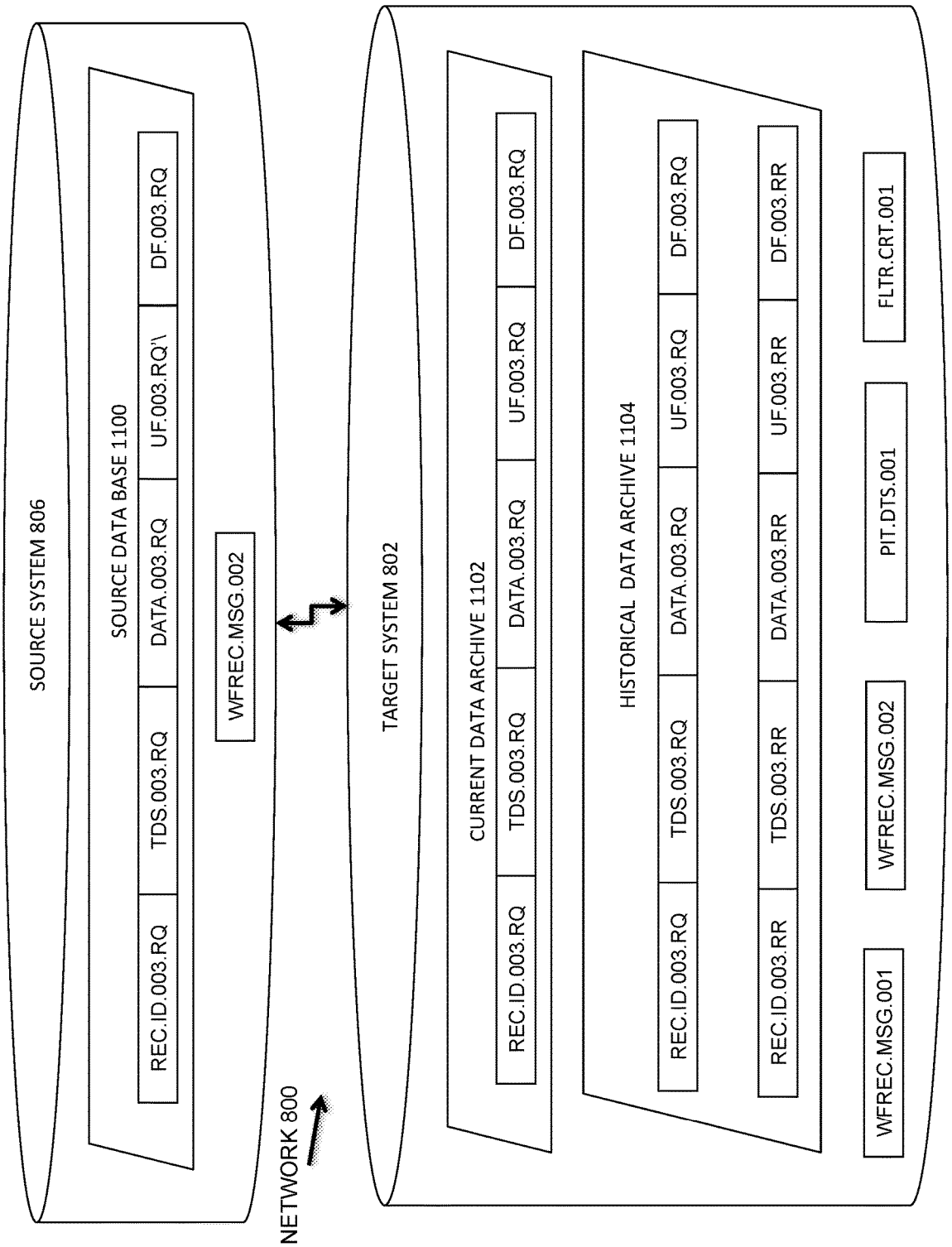
FIG. 17D is a detailed block diagram of the network of FIG. 8 in an exemplary fourth processing state succeeding the exemplary third processing state as shown in FIG. 17C.

Referring now generally to the Figures and particularly to FIG. 17D, FIG. 17D is a detailed block diagram of the network 800 in an exemplary fourth processing state succeeding the exemplary third processing state as shown in FIG. 17C and after an execution of step 13.18 For the sake of clarity of explanation, it is supposed that the network 800 is in the exemplary processing state occurring after an instance of execution of step 13.18, wherein the source database 1100 has been updated with the RQth third record version REC.003.RQ in accordance with the second workflow record WFREC.002 as supplied to the source system 806 in step 13.18. It is further understood that the instant second workflow record message WFREC.MSG.002 has been generated in a most recent execution of step 13.16 and contains the second workflow record WFREC.002 as generated in the most recent execution of step 13.10. The second workflow record message WFREC.MSG.002 is provided to the source system 806 in the most recent execution of the step 13.18.

Figure 18A:
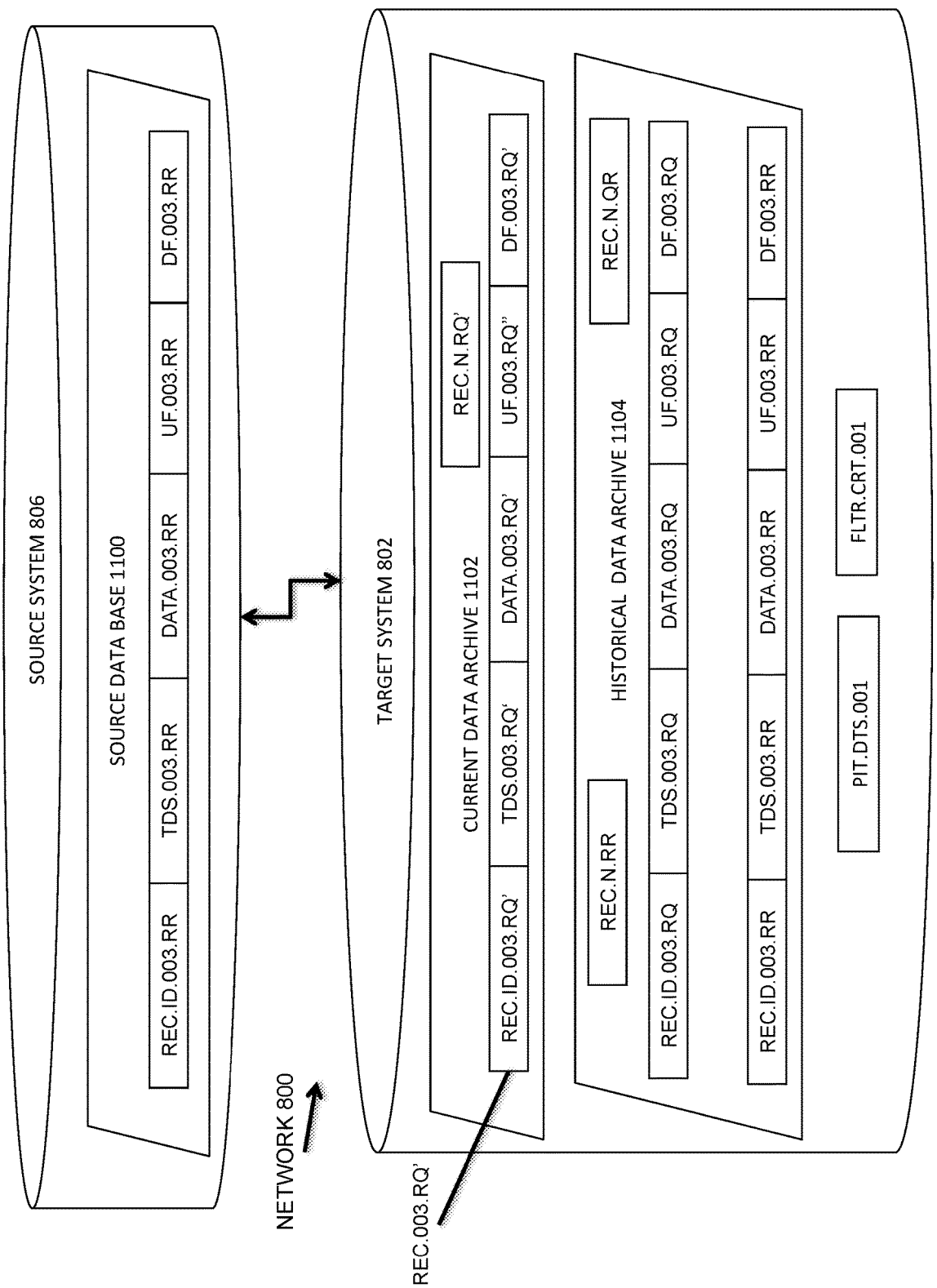
FIG. 18A is a detailed block diagram of the network of FIG. 8 in an exemplary first optional processing state of the method of FIG. 13.

Referring now generally to the Figures and particularly to FIG. 18A, FIG. 18A is a detailed block diagram of the network 800 in an exemplary first optional processing state of the method of FIG. 13 and in particular an execution of optional step 13.16. In step 13.12 an RQ'th third record version REC.003.RQ' is generated by population of the RQ'th third record version REC.003.RQ' with information selected from the RRth third record version REC.003.RR and the RQth third record version REC.003.RQ. In addition, an optional RN'th Nth record version is also generated in step 13.12 by population of the RQ'th third record version REC.003.RQ' with information selected from the RRth Nth record version REC.N.RR and the RQth Nth record version REC.003.RQ. The historical data archive 1102 is updated with the RRth third record version REC.003.RR and the Nth record version REC.N.RR in step 13.14. And in step 13.16 the current data archive 1102 is updated with the RQ'th third record version REC.003.RQ' and the RQ'th Nth record version REC.003.RN' in accordance with the first workflow record WFREC.001 and/or the second workflow record WFREC.002.

Figure 18B:
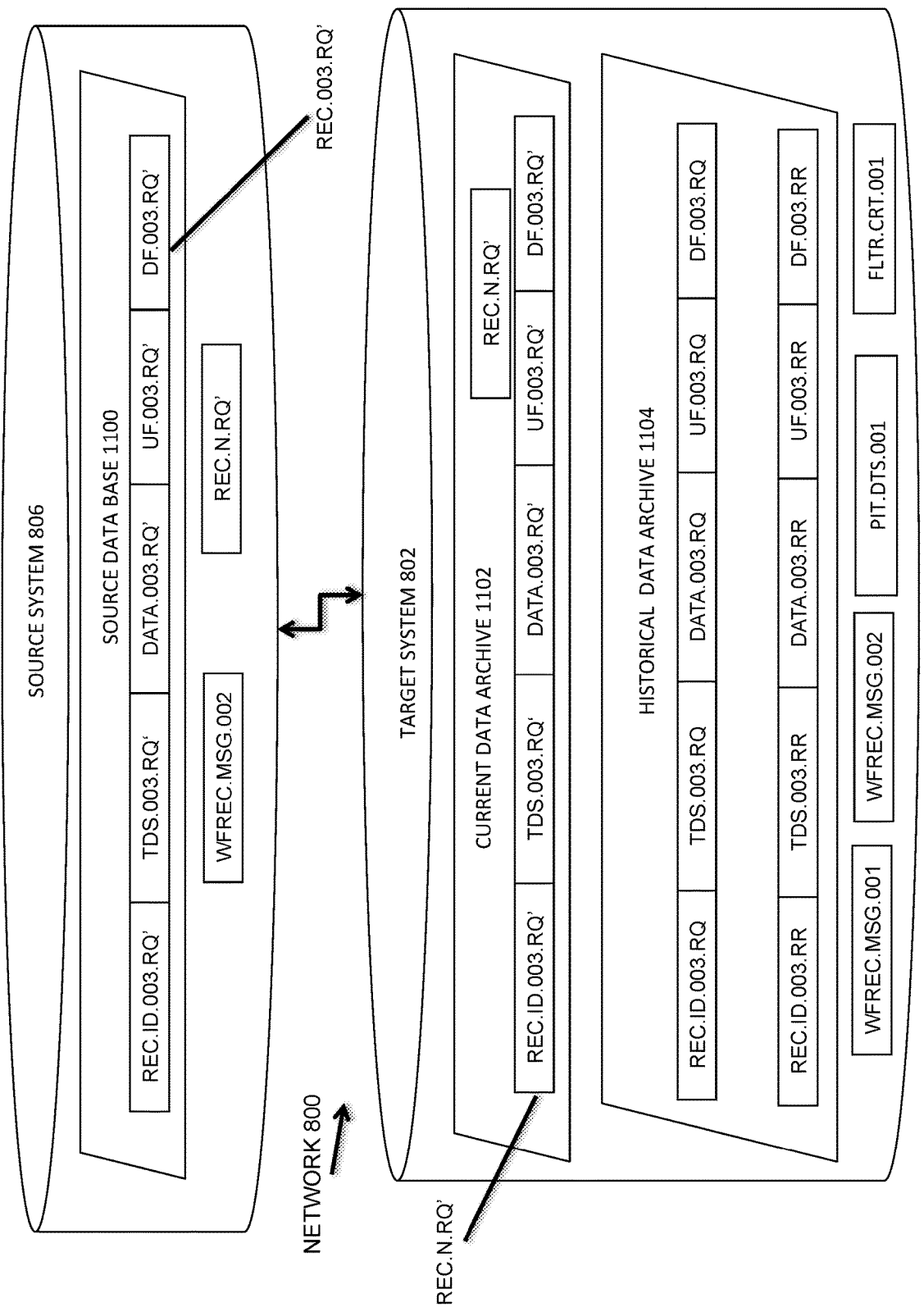
FIG. 18B, FIG. 18B is a detailed block diagram of the network of FIG. 8 in an exemplary second optional processing state succeeding the exemplary first optional processing state as shown in FIG. 18A.

Referring now generally to the Figures and particularly to FIG. 18B, FIG. 18B is a detailed block diagram of the network 800 in an exemplary second optional processing state succeeding the exemplary first optional processing state as shown in FIG. 18A and after an execution of step 13.18. For the sake of clarity of explanation, it is supposed that the network 800 is in the exemplary processing state occurring after an instance of execution of step 13.18, wherein the source database 1100 has been updated with the RQ'th third record version REC.003.RQ' in accordance with the second workflow record WFREC.002 as supplied to the source system 806 in step 13.18. It is further understood that the instant second workflow record message WFREC. MSG.002 has been generated in a most recent execution of step 13.16 and contains the second workflow record WFREC.002 as generated in the most recent execution of step 13.10. The second workflow record message WFREC. MSG.002 is provided to the source system 806 in the most recent execution of the step 13.18.

Figure 19:
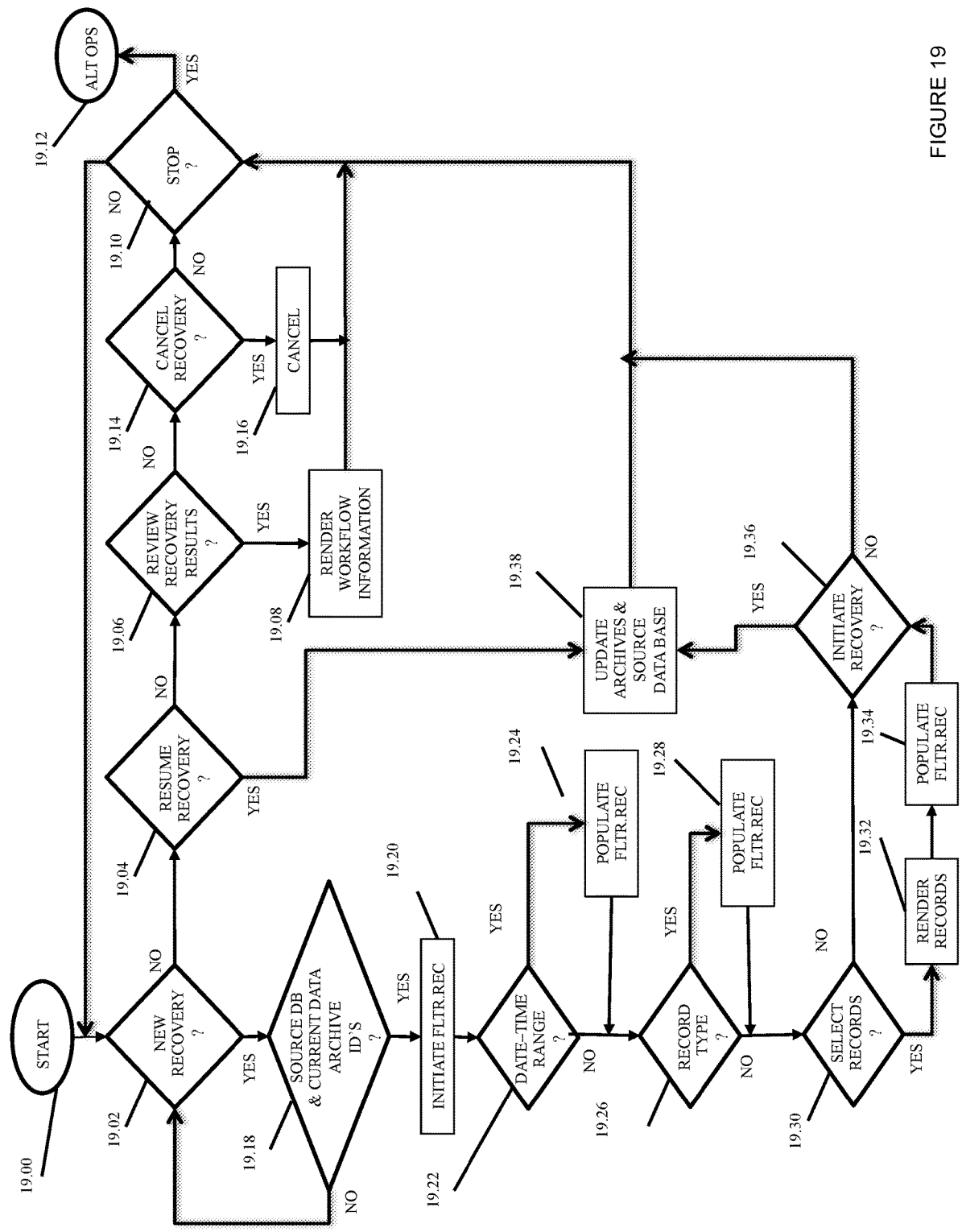
FIG. 19 is a flowchart of additional optional aspects of the invented recovery method implemented by the target system and the source system of FIG. 8.

Referring now generally to the Figures and particularly to FIG. 19, FIG. 19 is a flowchart of additional optional aspects of the invented recovery method wherein the target system 802 accepts filter parameters from via the input channel 802J and applies the received filter parameters in a recovery action as directed by the target system software SW.TGT. In step 19.00 the target system 802 powers up and enables receipt of user input via the input channel 802J. In step 19.02 the target system 802 determines whether an instruction has been received via the input channel 802J to initiate a new recovery process. When the target system 802 determines that an instruction has not been received to initiate a new recovery process in step 19.02, the target system 802 proceeds to step 19.04 and determines whether to resume a previously initiated recovery process. When the target system 802 determines in step 19.04 not to resume a previously initiated recovery process, the target system proceeds on to step 19.06 to determine whether an instruction has been received via the input channel 802J that directs the target system 802 to enable a review of a result of a completed recovery process. When the target system determines in step 19.06 to enable a review a results of a completed recovery process, the target system 802 proceeds on to step 19.08 and visually renders information contained in a workflow record WFREC.001 & WFREC.002 via the target display module 802E. The target system 802 proceeds from step 19.08 to step 19.10 and determines whether to proceed back to another execution of step 19.02 or to proceed on to alternate computational operations of step 19.12.

In the alternative, when the target system determines in step 19.06 to not enable a review a results of a completed recovery process, the target system 802 proceeds on from step 19.06 to step 19.14 to determine whether an instruction has been received via the input channel 802J that directs the target system 802 to cancel a recovery process. When the target system 802 determines in step 19.14 that an instruction has been received via the input channel 802J that directs the target system 802 to cancel a recovery process, the target system 802 cancels the instant recovery process in step 19.14 and proceeds on to step 19.10.

When the target system 802 determines that an instruction has been received to initiate a new recovery process in step 19.02, the target system 802 proceeds to step 19.18 and determines whether the source database 1100 and the current data archive 1102 have been identified for access and updating in the new recovery process requested in step 19.02. When the target system 802 does not determine that both the source database 1100 and the current data archive 1102 have been identified for access and updating in the new recovery process requested in step 19.02, the target system 802 returns to an additional execution of step 19.02. When the target system 802 determines in step 19.18 that both the source database 1100 and the current data archive 1102 have been identified for access and updating in the new recovery process requested in step 19.02, the target system 802 proceeds on to step 19.20 and initiates the a filter criteria parameter record, such as the exemplary first filter criteria record FLTR.CRT.001. Proceeding from step 19.20 to step 19.22, the target system 802 determines whether a date and time range bounds is to be applied in the recovery process requested in step 19.02, and when a date and time range bounds is to be applied in the requested recovery process, and optionally received in whole or in part via the input channel 802J, the instant date and time range bounds is written in step 19.24 into the exemplary first filter criteria record FLTR.CRT.001, and/or other suitable filter criteria record of data structure known in the art.

Proceeding from step 19.22 or step 19.24 to step 19.26, the target system 802 determines whether one or more record type indicator(s) RTYP.001-RTYP.NT are to be applied in the recovery process requested in step 19.02, and when one or more record type indicators RTYP.001-RTYP.NT are to be applied in the recovery process requested in step 19.02, and optionally received in whole or in part via the input channel 802J, the instant record type indicator(s) RTYP.001-RTYP.NT are written in step 19.28 into the exemplary first filter criteria record FLTR.CRT.001, and/or other suitable filter criteria records of data structure known in the art.

Proceeding from step 19.26 or step 19.28 to step 19.30, the target system 802 determines whether one or more record version identifiers REC.ID.001.RA-REC.ID.N.RR and/or record identifiers REC.ID.001-REC.ID.N are to be applied in the requested recovery process. When the target system 802 determines in step 19.30 that one or more record version identifiers REC.ID.001.RA-REC.ID.N.RR and/or record identifiers REC.ID.001-REC.ID.N are to be applied in the requested recovery process, the target system 802 proceeds on to step 19.32 renders, via the target system display module 802E, images of information contained within or associated with one or more record versions REC.001.RA-REC.N.RR and/or records REC.ID.001-REC.ID.N and accepts selections of record version identifiers REC.ID.001.RA-REC.ID.N.RR and/or record identifiers REC.ID.001-REC.ID.N thereof. The target system 802 proceeds from step 19.32 to step 19.34 and records the record version identifiers REC.ID.001.RA-REC.ID.N.RR and/or record identifiers REC.ID.001-REC.ID.N selected in step 19.32 into the exemplary first filter criteria record FLTR.CRT.001, and/or other suitable filter criteria records of data structure known in the art.

When one or more record version identifiers REC.ID.001.RA-REC.ID.N.RR AND/or record identifiers REC.ID.001-REC.ID.N are to be applied in the requested recovery process, and optionally received in whole or in part via the input channel 802J, the instant one or more record version identifiers REC.ID.001.RA-REC.ID.N.RR or record identifiers REC.ID.001-REC.ID.N are written into the exemplary first filter criteria record FLTR.CRT.001, and/or other suitable filter criteria records of data structure known in the art, in step 19.34.

The target system 802 proceeds from either step 19.34 or step 19.30 to step 19.36 and to determine whether to initiate the recovery process requested in step 19.02. When in step 19.36 the target system 802 determines to initiate the recovery process requested in step 19.02, the target system 802 proceeds on to step 19.38 and performs a recovery process in accordance with the aspects of the method of FIG. 13, and optionally applies the filter parameter criteria received, generated, determined and/or selected in steps 19.20 through 19.32, as populated in the first filter criteria record FLTR.CRT.001 and/or other suitable filter criteria records of data structure known in the art. The target system proceeds on from step 19.38 to step 19.10.

It is understood that the target system 802 optionally, additionally and/or alternatively from step 19.04 to step 19.38

When the target system 802 determines in step 19.36 to not initiate the recovery process requested in step 19.02, the target system 802 proceeds on to step 19.10.

Referring now generally to the Figures and particularly to FIG. 19 and FIG. 20 through FIG. 28, FIG. 20 through FIG. 28 present an interactive process driven of FIG. 19 via the target system 802 by the target system software SW.TGT in which a user (not shown) engages with the target system 802 by means of the target display module 802E and the target system input module 802D. It is understood that references herein to the user inputting information to the target system 802 and the user communicating GUI element selections to the target system 802 may be performed by means of the user applying the target system input module 802D and a point and click device of the target system input module 802D and/or via user communications enabled by the network 800.

Figure 20:
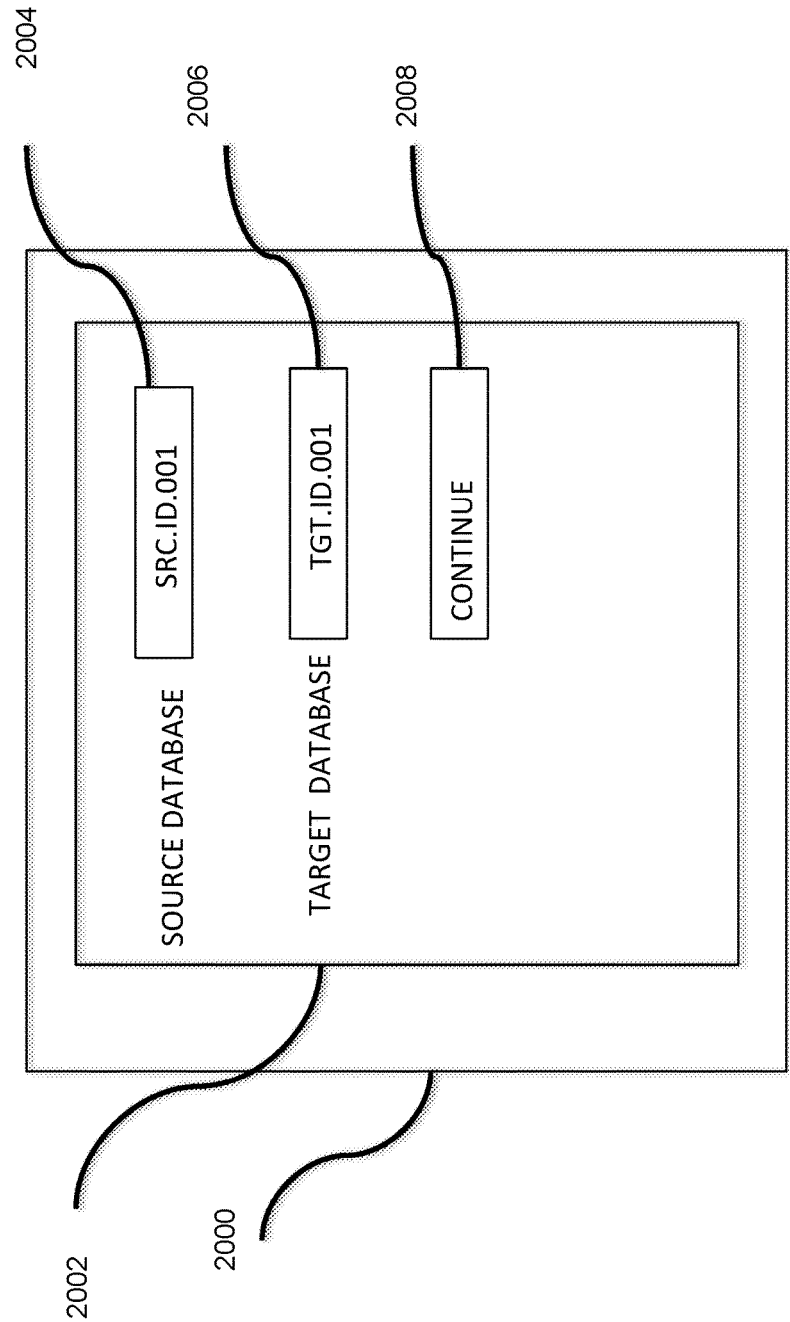
FIG. 20 is a screen shot of a first user input screen as rendered by the target display module of FIG. 9 in accordance with step 19.18 of FIG. 19.

Referring now generally to the Figures and particularly to FIG. 19 and FIG. 20, FIG. 20 is a screen shot of the display screen 2000 of the display module 802E of the target system 802 showing a first GUI 2002 of step 19.00 that enables the user via a first dialogue box 2004 to enter in or select a source system database identifier SRC.ID.001, e.g., the source object name OBJ.SRC.NM and/or the source server network address SRC.ADDR, as a record revision recovery destination node to be revised in an exemplary first recovery process. It is understood that the exemplary first recovery process is to be identified to the target system 802 hereinafter a second GUI 2100 with a first recovery process identifier PRC.ID.001. The first GUI 2002 further enables the user to enter in the target system database identifier TGT.ID.001, e.g., the current data archive object name OBJ.CDA.NM and/or the target network address TGT.SRC, as a source of record revisions to be provided to the source database 1100 in the second GUI 2100. Selection of a continue button 2008 by the user when rendered within the first GUI 2002 directs the target system 802 to proceed from step 19.00 to step 19.02 of the method of FIG. 19. Each process identifier, including the first recovery process identifier PRC.ID.001, is preferably associated in a unique one-to-one correspondence with a workflow record WFREC.001-WFREC.N initiated in an execution of step 19.20 and populated in iterations of steps 19.24, 19.28 and 19.34.

Figure 21:
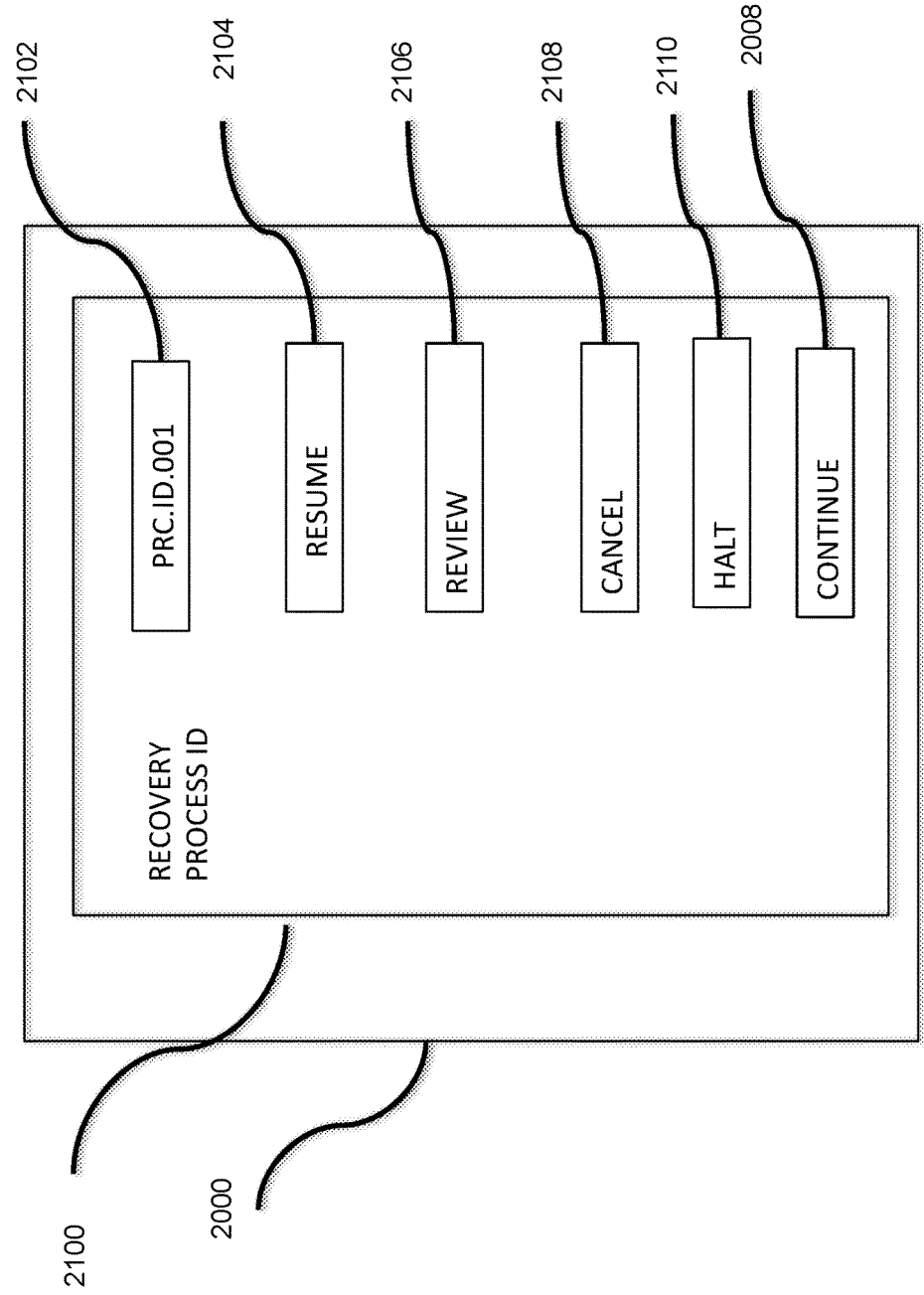
FIG. 21 is a screen shot of a second user input screen as rendered by the target display module of FIG. 9 in accordance with step 19.18 of FIG. 19.

Referring now generally to the Figures and particularly to FIG. 19 and FIG. 21, FIG. 21 is a screen shot of the display screen 2000 of the display module 802E of the target system 802 showing a second GUI 2100 that enables the user to direct the target system 802 to proceed from step 19.02 to steps 19.02, 19.06, 19.10 or 19.14.

Figure 22:
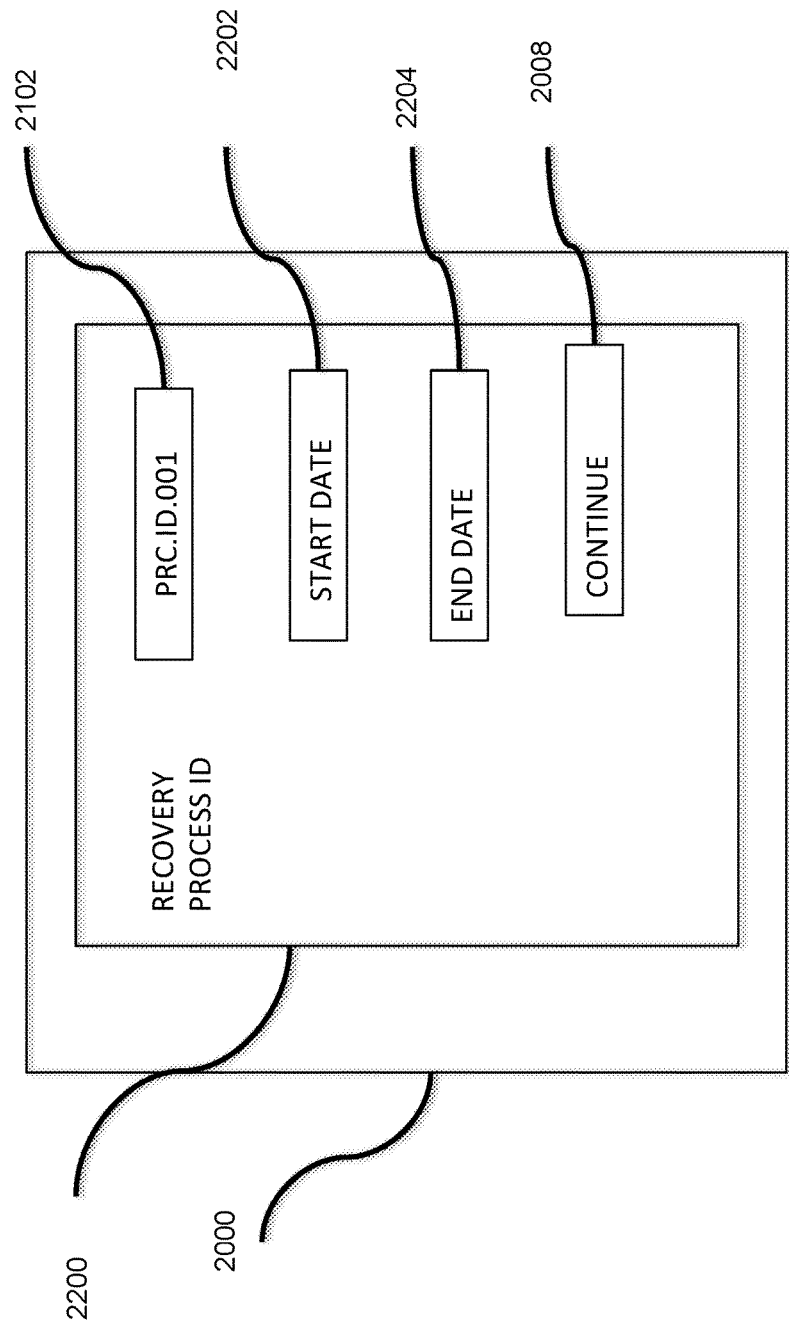
FIG. 22 is a screen shot of a third user input screen as rendered by the target display module of FIG. 9 in accordance with step 19.18 of FIG. 19.

The second GUI 2100 further enables the user to enter in, select or otherwise communicate the first recovery process identifier PRC.ID.001, or alternate recovery process identifier, in the process identifier dialogue box 2102. Selection of the continue button 2008 by the user when the continue button 2008 is rendered within the second GUI 2100, and while an associated recovery process identifier is currently indicated, input, and/or selected to the target system 802, directs the target system 802 to proceed from step 19.02 to step 19.18 of the method of FIG. 19, wherein a third GUI 2200 of FIG. 22 is rendered.

Alternatively, selection by the user of the resume button 2104 when the continue button 2008 is rendered within the second GUI 2100 and while an associated recovery process identifier is currently indicated, input, and/or selected to the target system 802, directs the target system 802 to proceed from step 19.02 to steps 19.04 and 19.38 of the method of FIG. 19. Further alternatively, selection by the user of the review button 2106 when the continue button 2008 is rendered within the second GUI 2100 and while an associated recovery process identifier is currently indicated, input, and/or selected to the target system 802, directs the target system 802 to proceed from step 19.02 to step 19.08 of the method of FIG. 19.

Still further alternatively, selection by the user of the cancel button 2108 when the continue button 2008 is rendered within the second GUI 2100 and while an associated recovery process identifier is currently indicated, input, and/or selected to the target system 802, directs the target system 802 to proceed from step 19.02 or step 19.14 to step 19.16 of the method of FIG. 19.

Yet further alternatively, selection by the user of the halt button 2110 when the continue button 2008 is rendered within the second GUI 2100 directs the target system 802 to proceed from step 19.08, 19.14 or step 19.16 to step 19.10 of the method of FIG. 19.

Referring now generally to the Figures and particularly to FIG. 19 and FIG. 22, FIG. 22 is a screen shot of the display screen 2000 of the display module 802E of the target system 802 showing a third GUI 2200 of step 19.22. The user may communicate, enter in or select a start date and time for the date-time range selection input of step 19.22 optionally in association with a start time dialog box 2202; the user may additionally or alternatively communicate, enter in or select an end date and time for the date-time range selection input of step 19.22 optionally in association with an end time dialog box 2204.

Figure 23:
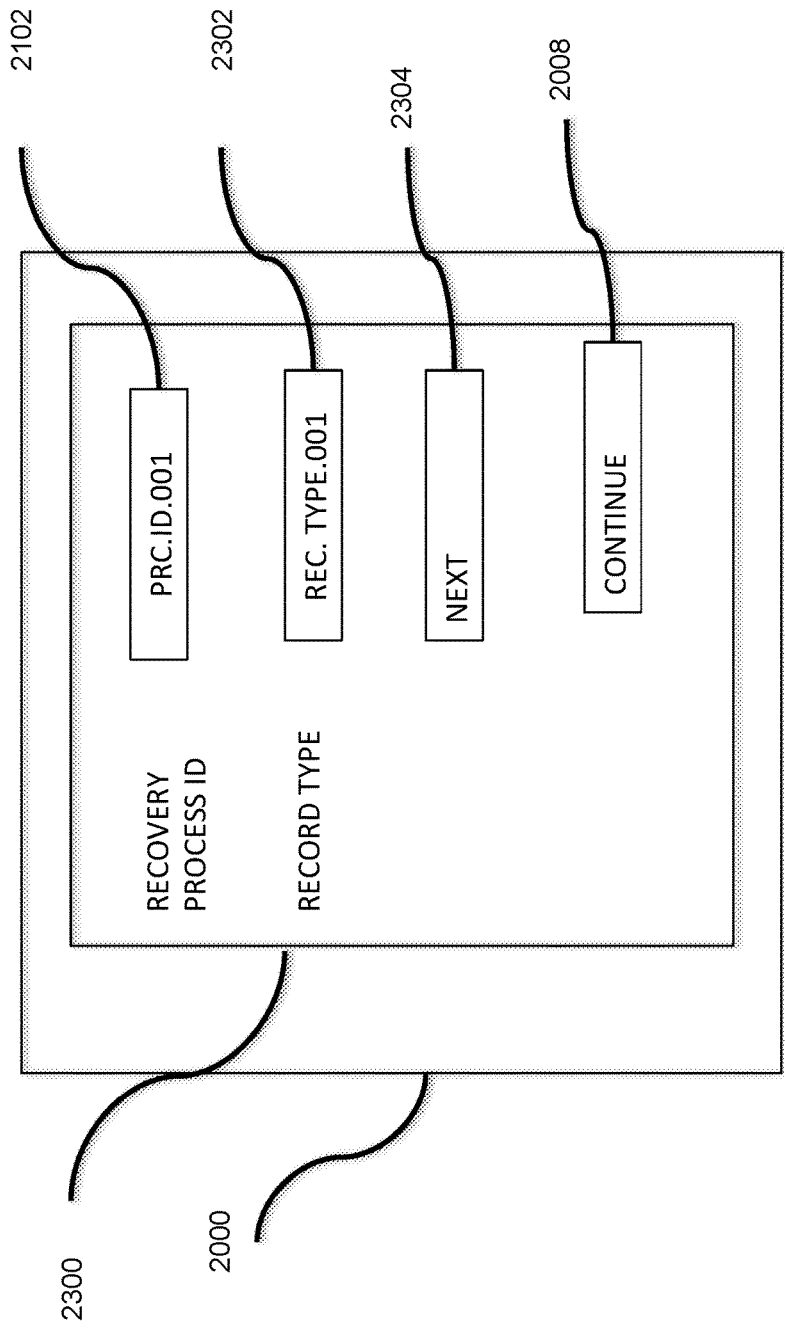
FIG. 23 is a screen shot of a fourth user input screen as rendered by the target display module of FIG. 9 in accordance with step 19.26 of FIG. 19.

Selection of the continue button 2008 by the user when the continue button 2008 is rendered within the third GUI 2200, and while an associated recovery process identifier is currently indicated, input, and/or selected to the target system 802, directs the target system 802 to proceed from step 19.22 to step 19.26 of the method of FIG. 19, wherein a fourth GUI 2300 of FIG. 23 is rendered.

Referring now generally to the Figures and particularly to FIG. 19 and FIG. 23, FIG. 23 is a screen shot of the display screen 2000 of the display module 802E of the target system 802 showing a fourth GUI 2300 of step 19.26.

The user may communicate, enter in or select a record type for record type input of step 19.22 optionally in association with a record type dialog box 2302. Additionally or alternatively, the user may communicate, enter in or select an instruction the target system 802 to prepare to accept an additional record type selection of step 19.22 by selection of the next record type dialog box 2304.

Figure 24:
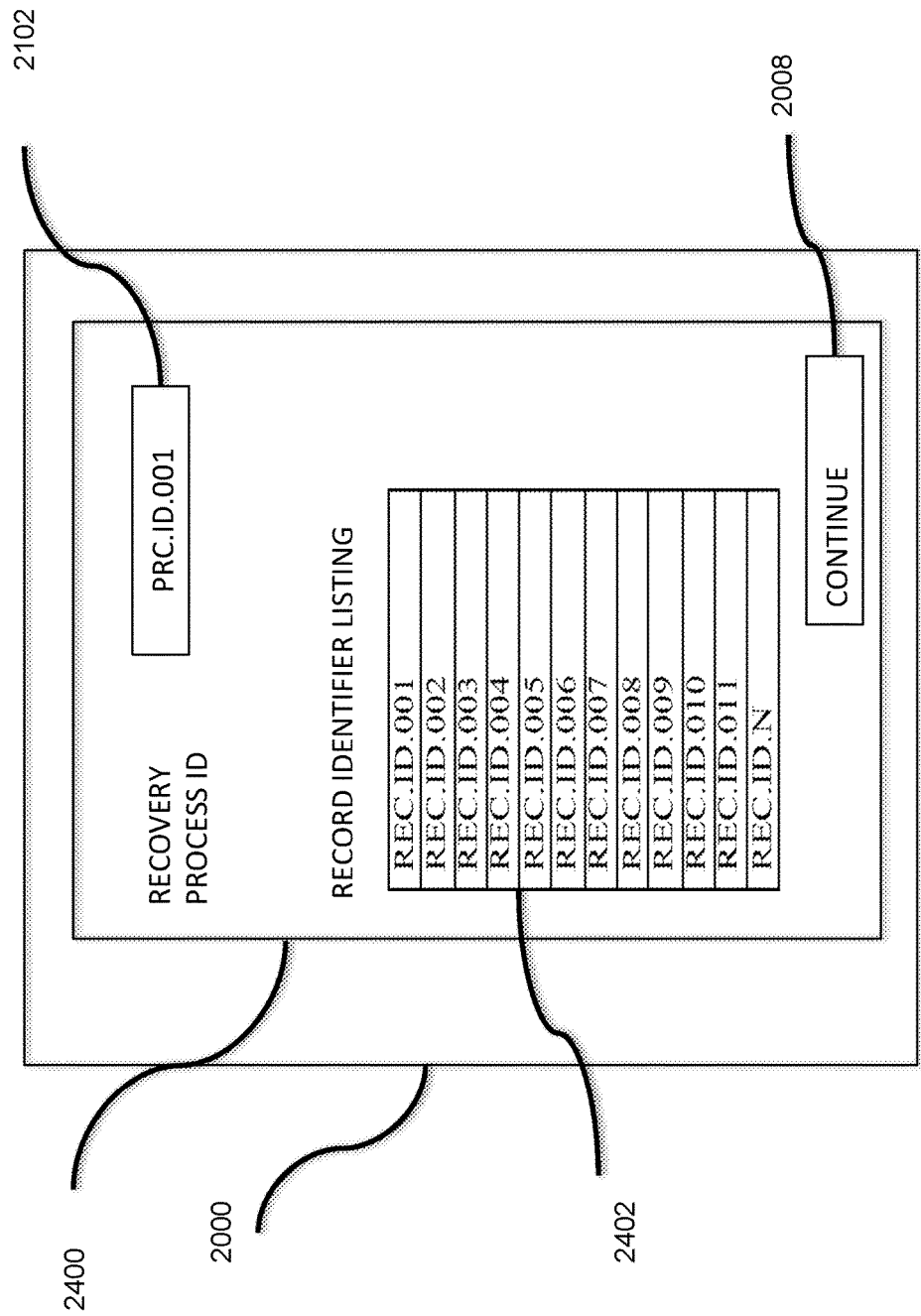
FIG. 24 is a screen shot of a fifth user input screen as rendered by the target display module of FIG. 9 in accordance with step 19.30 of FIG. 19.

Selection of the continue button 2008 by the user when the continue button 2008 is rendered within the fourth GUI 2300, and while an associated recovery process identifier is currently indicated, input, and/or selected to the target system 802, directs the target system 802 to proceed from step 19.26 to step 19.30 of the method of FIG. 19, wherein a fifth GUI 2400 of FIG. 24 is rendered.

Referring now generally to the Figures and particularly to FIG. 19 and FIG. 24, FIG. 24 is a screen shot of the display screen 2000 of the display module 802E of the target system 802 showing a fifth GUI 2400 of step 19.30. In a record selection window 2402 of the a fifth GUI 2400 the user is enabled to select or communicate a selection of one or more record identifiers REC.ID.001-REC.ID.N to be included in a recovery process of step 19.38.

Figure 25:
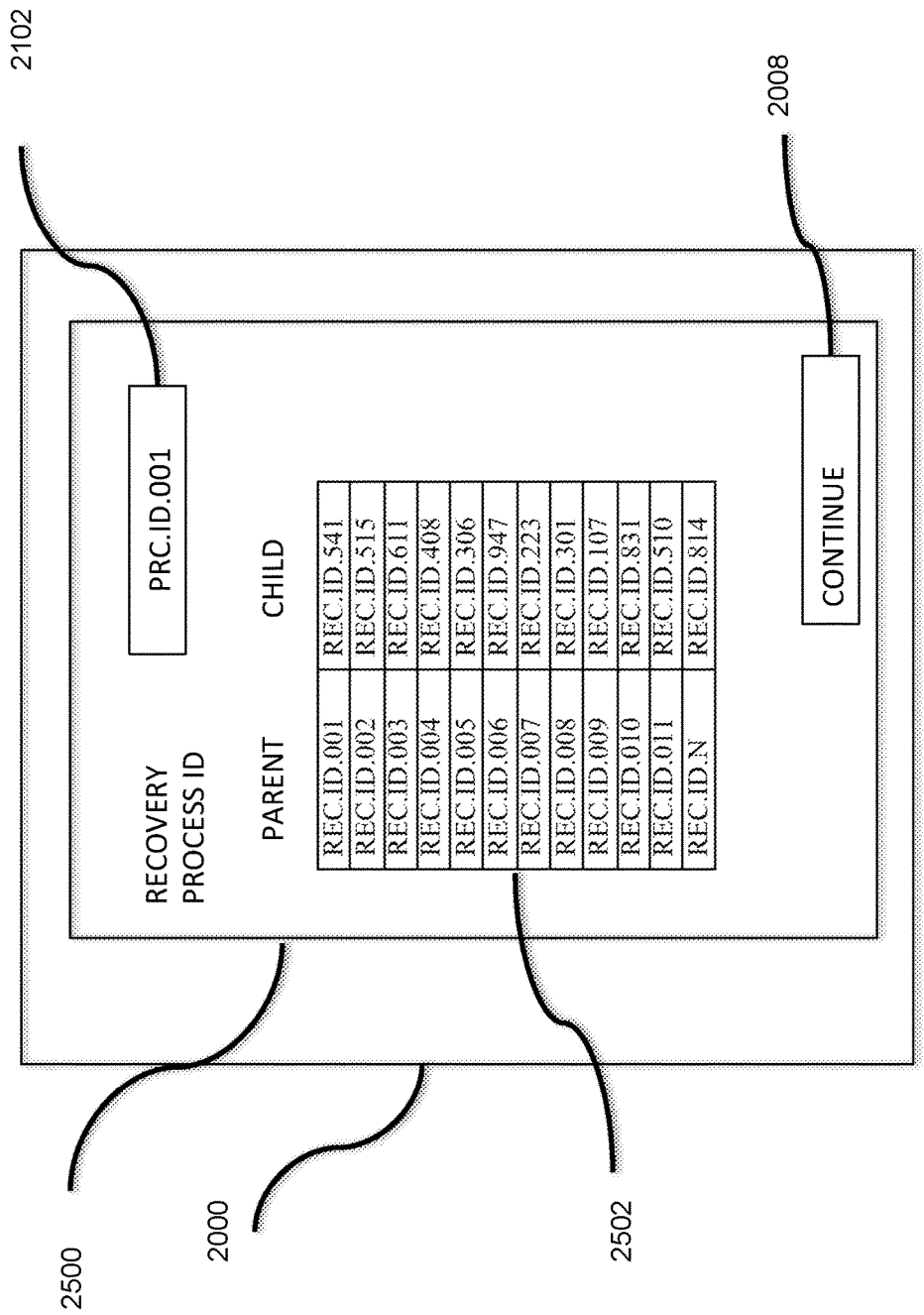
FIG. 25 is a screen shot of a sixth user input screen as rendered by the target display module of FIG. 9 in accordance with step 19.30 of FIG. 19; presented generally in the Figures and particularly in FIG. 13 and accompanying text.

Selection of the continue button 2008 by the user when the continue button 2008 is rendered within the fifth GUI 2400, and while an associated recovery process identifier is currently selected, input, and/or communicated to the target system 802, directs the target system 802 to proceed to render a sixth GUI 2500 of FIG. 25.

Referring now generally to the Figures and particularly to FIG. 19 and FIG. 25, FIG. 25 is a screen shot of the display screen 2000 of the display module 802E of the target system 802 showing a sixth GUI 2500 of step 19.30. In a child record selection window 2502 of the fifth GUI 2400 the user is enabled to select or communicate a selection of one or more child record identifiers REC.ID.223-REC.ID.814 to be included in a recovery process of step 19.38. Each child record identifier REC.ID.223-REC.ID.814 is preferably rendered in visual association with a related parent record identifier REC.001-REC.N.

Figure 26:
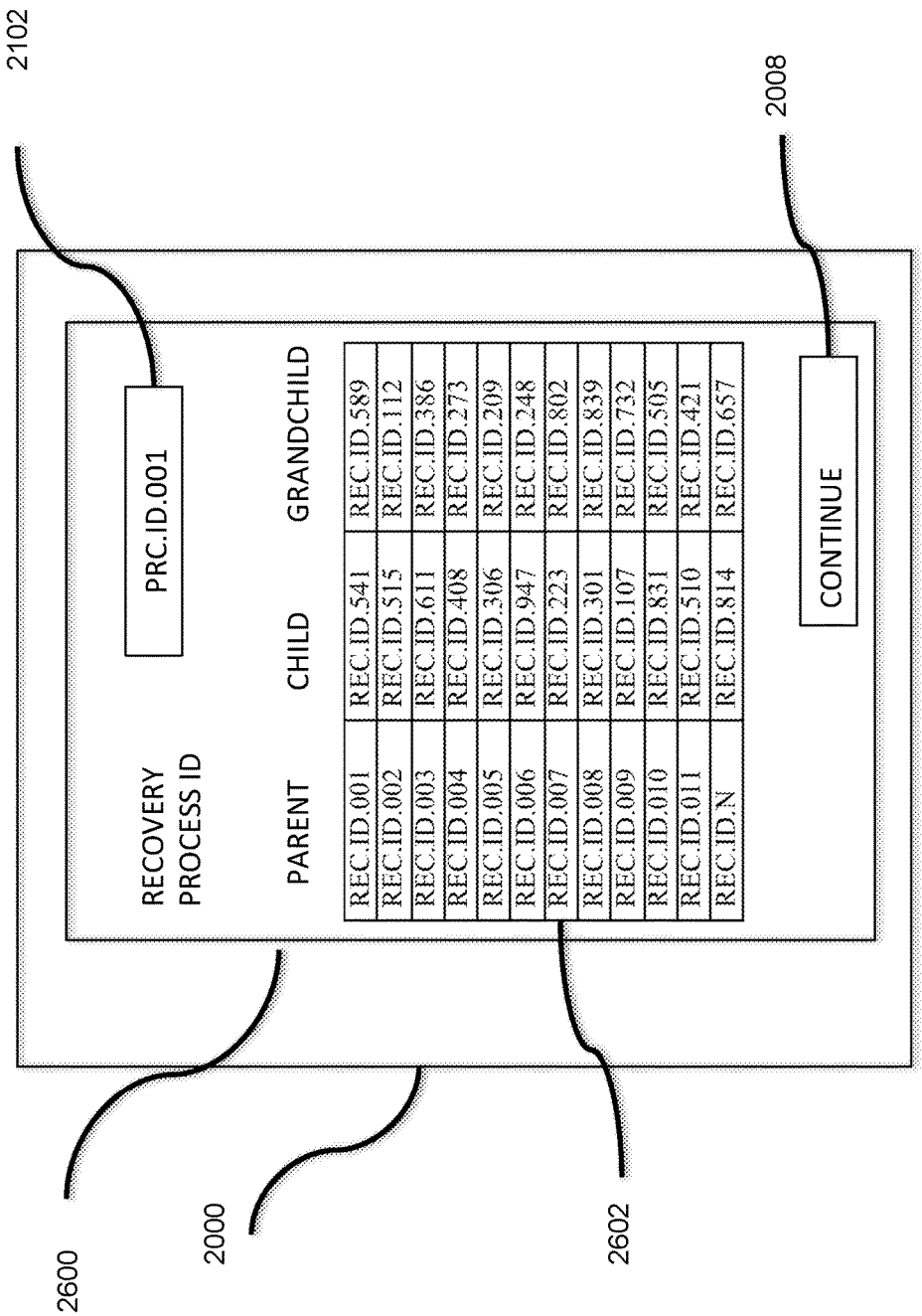
FIG. 26 is a screen shot of a seventh user input screen as rendered by the target display module of FIG. 9 in accordance with step 19.30 of FIG. 19.

Selection of the continue button 2008 by the user when the continue button 2008 is rendered within the sixth GUI 2500, and while an associated recovery process identifier is currently selected, input, and/or communicated to the target system 802, directs the target system 802 to proceed to render a seventh GUI 2600 of FIG. 26.

Referring now generally to the Figures and particularly to FIG. 19 and FIG. 26, FIG. 26 is a screen shot of the display screen 2000 of the display module 802E of the target system 802 showing a seventh GUI 2600 of step 19.30. In a grandchild record selection window 2502 of the a fifth GUI 2400 the user is enabled to select or communicate a selection of one or more grandchild record identifiers REC.ID.209-REC.ID.839 to be included in a recovery process of step 19.38. Each grandchild record identifier REC.ID.223-REC.ID.814 is preferably rendered in visual association with a related parent record identifier REC.001-REC.N and a child record identifier REC.ID.223-REC.ID.814 related to both a visually associated related parent record identifier REC.001-REC.N and grandchild record identifier REC.ID.209- REC.ID.839.

Figure 27:
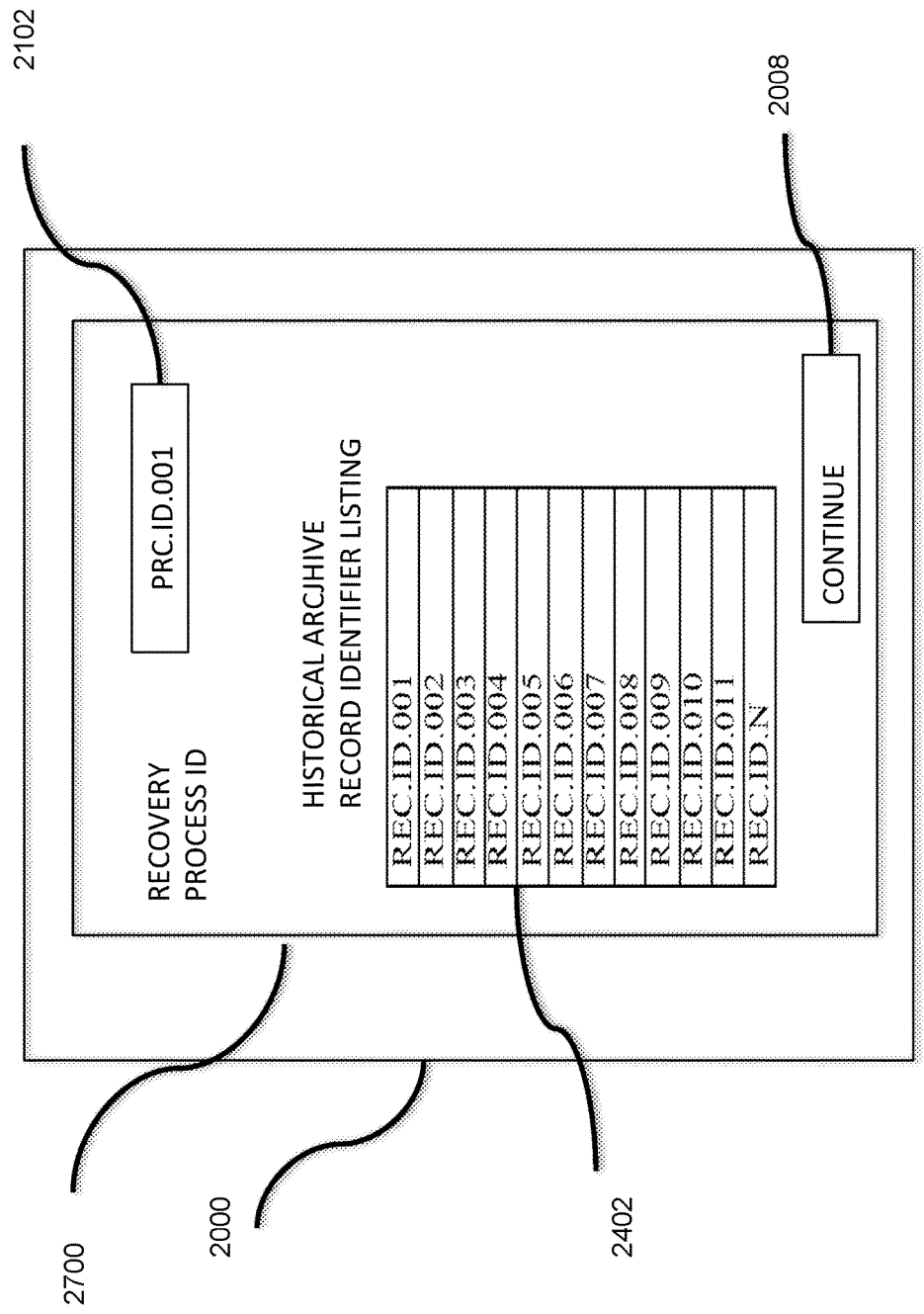
FIG. 27 is a screen shot of an eighth user input screen as rendered by the target display module of FIG. 9 in accordance with step 19.30 of FIG. 19.

Selection of the continue button 2008 by the user when the continue button 2008 is rendered within the seventh GUI 2600, and while an associated recovery process identifier is currently selected, input, and/or communicated to the target system 802, directs the target system 802 to proceed to render an eighth GUI 2700 of FIG. 27.

Referring now generally to the Figures and particularly to FIG. 19 and FIG. 27, FIG. 27 is a screen shot of the display screen 2000 of the display module 802E of the target system 802 showing an eighth GUI 2700 of step 19.30. In a historical record selection window 2702 of the eighth GUI 2700 the user is enabled to select or communicate a selection of one or more record identifiers REC.ID.001-REC.ID.N as stored in the historical data archive 1104 to be included in a recovery process of step 19.38.

Selection of the continue button 2008 by the user when the continue button 2008 is rendered within the eighth GUI 2700, and while an associated recovery process identifier is currently selected, input, and/or communicated to the target system 802, directs the target system 802 to proceed to execute steps 19.34 and 19.34 of FIG. 19. And to render a ninth GUI 2800 of FIG. 28 and step 19.36 of FIG. 19.

Referring now generally to the Figures and particularly to FIG. 19 and FIG. 28, FIG. 28 is a screen shot of the display screen 2000 of the display module 802E of the target system 802 showing a ninth GUI 2800 of step 19.36.

Selection of the initiate button 2802 by the user when the initiate button 2802 is rendered within the ninth GUI 2800, and while an associated recovery process identifier is currently indicated, input, and/or selected to the target system 802, directs the target system 802 to proceed from step 19.36 to step 19.38 of the method of FIG. 19, wherein a recovery process associated with a unique process identifier, e.g., the first recovery process identifier PRD.ID.001, is initiated, and an associated workflow record WFREC.001-WFREC.N initiated in an execution of step 19.20 and populated in iterations of steps 19.24, 19.28 and 19.34 is applied and accessed.

Alternatively, selection by the user of the continue button 2008 when the continue button 2008 is rendered within the ninth GUI 2800 directs the target system 802 to proceed from step 19.36 or step 19.10 of the method of FIG. 19.

Further alternatively, selection by the user of the resume button 2104 when the resume button 2104 is rendered within the ninth GUI 2800 directs the target system 802 to proceed from step 19.36 or step 19.10 of the method of FIG. 19.

Still further alternatively, selection by the user of the review button 2106 when the review button 2106 is rendered within the ninth GUI 2800 directs the target system 802 to proceed from step 19.36 or step 19.10 of the method of FIG. 19.

Yet further alternatively, selection by the user of the cancel button 2108 when the cancel button 2108 is rendered within the ninth GUI 2800 directs the target system 802 to proceed from step 19.36 or step 19.10 of the method of FIG. 19.

Even further alternatively, selection by the user of the halt button 2110 when the halt button 2110 is rendered within the ninth GUI 2800 directs the target system 802 to proceed from step 19.36 or step 19.10 of the method of FIG. 19.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

What is claimed is:

1. A system comprising:
    a non-transitory memory comprising a current copy of a source database, a current data archive and a historical data archive, wherein the historical data archive comprises prior versions of a plurality of records previously received via the current data archive;
    a display device;
    an input channel receiving selections and selection data; and
    one or more processors communicatively coupled with the memory, the display device and the input channel, and the one or more processors configured to perform operations comprising:
        displaying a first user interface element on the display device, the first user interface element enabling a receipt from the input channel of a date and time range to filter records by update time stamps as are individually associated with each record of a record archive;
        displaying a second user interface element on the display device, the second user interface element enabling a receipt from the input channel of one or more record types to include in a record recovery action;
        displaying a third user interface element on the display device, the third user interface element displaying a listing of a plurality of record types and enabling a receipt from the input channel each displayed record type for inclusion in a record recovery action;
        displaying a fourth user interface element on the display device, the fourth user interface element displaying and enabling a receipt from the input channel of an additional plurality of records from a plurality of relationally related records present in the current data archive in separated lists for each distinguishable record type;
            displaying a fifth user interface element on the display device, the fifth user interface element displaying and enabling a receipt from the input channel of a specific version of a record from the historical data archive for a given record present in the current data archive;
        generating a recording of a recovery workflow specifying selected records for use by an information recovery process;
        copying each record specified in the information recovery workflow from the current data archive into the historical data archive;
        updating specified records into the corresponding records in the current data archive;
        setting a recovery status field flag in records updated in the current data archive in accordance with the recovery workflow; and
        updating the source database in accordance with each record updated in the current data archive by using the recovery status field flag as an indicator of whether to newly create records or update source database records specified in the recovery workflow.

2. The system of claim 1, wherein the current data archive comprises the source database.

3. The system of claim 1, wherein the source database is at least partially maintained in a remote database server accessible via an electronics communications network.

4. The system of claim 1, wherein the current data archive comprises a relational database.

5. The system of claim 1, wherein the current data archive comprises an object-oriented database.

6. The system of claim 1, wherein the current data archive comprises a NoSQL database.

7. The system of claim 1, wherein the historical data archive is at least partially maintained in a remote database server accessible via an electronics communications network.

8. The system of claim 1, wherein the historical data archive comprises a relational database.

9. The system of claim 1, wherein the historical data archive comprises an object-oriented database.

10. The system of claim 1, wherein the historical data archive comprises a NoSQL database.

11. The system of claim 1, wherein the list of all available records is limited to records which match specified value ranges of a searchable field.

12. The system of claim 1, wherein a plurality of fields is selected from at least one record displayed in the current data archive.

13. The system of claim 1, wherein a plurality of fields is selected from a displayed plurality of records displayed via the display device as rendered from the historical data.

14. The system of claim 1, wherein a plurality of fields is selected from a plurality of relationally related records displayed by reference or content in the current data archive.

15. The system of claim 1, wherein the update time stamp is less than a specified point-in-time range for each unique record identifier, and there are no newer records with a matching unique record identifier comprising an update timestamp that is less than the specified point-in-time range.

16. The system of claim 1, wherein the current data archive is comprised within the source database.

17. The system of claim 1, wherein the current data archive is at least partially maintained in a database server accessible via an electronics communications network.

18. The system of claim 17, is at least partially maintained in a database server accessible via an electronics communications network.

19. The system of claim 1, wherein the current data archive is comprised within a database.

20. The system of claim 1, wherein the historical data archive is comprised within a database.

* * * * *